(12) United States Patent
Jiao et al.

(10) Patent No.: US 12,218,736 B2
(45) Date of Patent: Feb. 4, 2025

(54) COMMUNICATION METHOD AND APPARATUS

(71) Applicant: Huawei Technologies Co., Ltd., Shenzhen (CN)

(72) Inventors: Chunxu Jiao, Shanghai (CN); Pu Yuan, Shenzhen (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 17/663,347

(22) Filed: May 13, 2022

(65) Prior Publication Data
US 2022/0271822 A1    Aug. 25, 2022

Related U.S. Application Data

(63) Continuation of application No. PCT/CN2019/118924, filed on Nov. 15, 2019.

(51) Int. Cl.
*H04B 7/08* (2006.01)
*H04L 5/00* (2006.01)
(Continued)

(52) U.S. Cl.
CPC .......... *H04B 7/088* (2013.01); *H04L 5/0051* (2013.01); *H04W 16/28* (2013.01); *H04W 24/10* (2013.01); *H04W 76/19* (2018.02)

(58) Field of Classification Search
CPC .. H04B 7/088; H04B 7/06954; H04B 7/0695; H04L 5/0051; H04W 16/28; H04W 24/10; H04W 76/19; H04W 64/006
See application file for complete search history.

(56) References Cited

U.S. PATENT DOCUMENTS 10,660,063 B2 *   5/2020   Park ................... H04W 68/005
11,039,350 B2 *   6/2021   Cirik ................. H04W 36/0079
(Continued)

FOREIGN PATENT DOCUMENTS

CN    109005548 A    12/2018
CN    110289896 A     9/2019
(Continued)

OTHER PUBLICATIONS

Huawei et al., "Beamforming for V2X sidelink for FR1 and FR2", 3GPP TG RAN WG1 Meeting #96, R1-1903075, Feb. 25,-Mar. 1, 2019, 4 Pages, Athens, Greece.

Vivo., "Remaining issue on sidelink configure grant", 3GPP TG-RAN WG2 Meeting #107bis, R2-1912258, Oct. 14-18, 2019, 9 Pages, Chongqing, China.

(Continued)

*Primary Examiner* — Brian T O'Connor
(74) *Attorney, Agent, or Firm* — Slater Matsil, LLP

(57) ABSTRACT

A first terminal apparatus sends K2 first reference signals to a second terminal apparatus in K1 directions. The first terminal apparatus determines that beams in the K1 directions all fail for N1 consecutive times. The first terminal apparatus sends P2 second reference signals to the second terminal apparatus in P1 directions. The first terminal apparatus determines, based on measurement results that are of the P2 second reference signals and that are from the second terminal apparatus, whether P1 beams corresponding to the P1 directions are available.

20 Claims, 8 Drawing Sheets

(51) Int. Cl.
*H04W 16/28* (2009.01)
*H04W 24/10* (2009.01)
*H04W 76/19* (2018.01)

(56) References Cited

U.S. PATENT DOCUMENTS

| | | | | |
|---|---|---|---|---|
| 11,497,030 | B2* | 11/2022 | Liu | H04L 5/0051 |
| 11,641,232 | B2* | 5/2023 | Kang | H04B 7/0626 |
| | | | | 370/329 |
| 11,647,493 | B2* | 5/2023 | Zhou | H04W 72/046 |
| | | | | 370/225 |
| 11,716,663 | B2* | 8/2023 | Liou | H04W 36/305 |
| | | | | 370/225 |
| 11,943,641 | B2* | 3/2024 | Nagaraja | H04W 74/04 |
| 12,089,103 | B2* | 9/2024 | Cirik | H04W 36/06 |
| 2019/0081691 | A1 | 3/2019 | Nagaraja et al. | |
| 2019/0110281 | A1 | 4/2019 | Zhou et al. | |
| 2021/0028849 | A1* | 1/2021 | Chin | H04B 7/06964 |

FOREIGN PATENT DOCUMENTS

| | | |
|---|---|---|
| WO | 2018210226 A1 | 11/2018 |
| WO | 2018223972 A1 | 12/2018 |
| WO | 2019174532 A1 | 9/2019 |

OTHER PUBLICATIONS

Huawei et al., "Discussion on SCell BFR measurements for NR eMIMO", 3GPP TSG-RAN WG4 Meeting #92bis, R4-1911920, Chongqing, China, Oct. 14-18, 2019, 3 pages.
Huawei et al., "Procedure Details for Beam Failure Recovery", 3GPP TSG RAN WG1 Meeting #90, R1-1712224, Prague, Czech Republic, Aug. 21-25, 2017, 12 pages.
3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.
3GPP TS 38.213 V15.7.0 (Sep. 2019), 3rd Generation Partnership Project; Technical Specification Group Radio Access Network; NR; Physical layer procedures for control (Release 15), 108 pages.

* cited by examiner

COMMUNICATION METHOD AND APPARATUS

CROSS-REFERENCE TO RELATED APPLICATIONS

This application is a continuation of International Application No. PCT/CN2019/118924, filed on Nov. 15, 2019, the disclosure of which is hereby incorporated by reference in its entirety.

TECHNICAL FIELD

This application relates to the field of mobile communication technologies, and in particular, to a communication method and an apparatus.

BACKGROUND

In the past several decades, wireless communication systems experienced technical evolution from first-generation analogue communication to fifth-generation mobile communication technology (5G) new radio (NR). In the complex evolution process, a change in use of a frequency band by each generation of communication system is an important aspect. However, for previous generations of wireless communication including a fourth-generation mobile communication technology (4G) long term evolution (LTE) system, changes in frequency bands thereof are all limited to a low frequency band below 6 GHz. Limited by a limited frequency spectrum and available bandwidth, communication performance in a low frequency band is strictly limited, and a high-capacity communication service cannot be supported. In a 5G system, wireless communication is not subject to such a limitation, and frequency range 2 (FR2) is defined, to implement deployment and application of a frequency band above 6 GHz.

In FR2, frequency spectrum resources are abundant and a bandwidth range is large, and data transmission channels are provided for a plurality of new types of services, for example, virtual reality, high-definition video transmission, and vehicle-to-everything (V2X), that require high-capacity communication. Particularly, in terms of V2X, application of FR2 has far-reaching impact on sidelink (SL) communication, and provides key support for implementing functions such as vehicle platooning, an extended sensor, and autonomous driving. However, a PC5 interface on an SL has many features that a Uu interface in NR does not have. Therefore, some technical problems occur. For example, a Uu interface in an NR system has a beam failure detection (BFD) mechanism, so that whether a beam fails can be detected, and a service delay can be reduced. However, in the SL communication, there has been no BFD mechanism yet, and whether the beam fails cannot be detected.

SUMMARY

Embodiments of this application provide a communication method and an apparatus, to provide a beam failure detection mechanism in SL communication.

According to a first aspect, a first communication method is provided. The method includes: A first terminal apparatus sends K2 first reference signals to a second terminal apparatus in K1 directions, where each of the K1 directions is a direction in which the first terminal apparatus sends a data signal to the second terminal apparatus, one first reference signal in the K2 first reference signals is used to detect whether a beam in a direction in which the first reference signal is located fails, both K1 and K2 are positive integers, and K2 is greater than or equal to K1. The first terminal apparatus determines that beams in the K1 directions all fail for N1 consecutive times, where N1 is a positive integer. The first terminal apparatus sends P2 second reference signals to the second terminal apparatus in P1 directions, where one second reference signal in the P2 second reference signals is used to measure quality of a beam in a direction in which the first reference signal is located, the P1 directions are a part or all of sending directions supported by the first terminal apparatus, P1 is a positive integer, and P2 is an integer greater than or equal to P1. The first terminal apparatus receives measurement results that are of the P2 second reference signals and that are from the second terminal apparatus. The first terminal apparatus determines, based on the measurement results of the P2 second reference signals, whether P1 beams corresponding to the P1 directions are available.

The method may be performed by a first communication apparatus. The first communication apparatus may be a communication device or a communication apparatus, for example, a chip, that can support the communication device in implementing a function required by the method. For example, the first communication apparatus is the first terminal apparatus. For example, the first terminal apparatus is a terminal device, is a chip that is disposed in the terminal device and that is configured to implement a function of the terminal device, or is another component configured to implement the function of the terminal device. In the following description process, an example in which the first communication apparatus is the first terminal apparatus is used.

In this embodiment of this application, the first terminal apparatus may send the first reference signals to the second terminal apparatus, so that the first terminal apparatus can determine whether the beams in the K1 directions fail. This is equivalent to providing a beam failure detection mechanism in SL communication. In addition, if the first terminal apparatus determines that the beams in the K1 directions fail, the first terminal apparatus may further send the P2 second reference signals to the second terminal apparatus in the P1 directions. It may be understood as that the K1 directions are directions corresponding to serving beams of the first terminal apparatus, and the P1 directions are the part or all of the sending directions supported by the first terminal apparatus. A quantity of directions included in the P1 directions may be greater than a quantity of directions included in the K1 directions. In other words, if the beams in the K1 directions fail, the first terminal apparatus may continue to determine whether there is an available beam in more directions (namely, the P1 directions). A possibility that there is an available beam in the P1 directions is greater than a possibility that there is an available beam in the K1 directions, so that a possibility of obtaining the available beam is improved. In this manner, the available beam is determined by using a physical layer as much as possible. In other words, beam recovery is performed by using the physical layer. Beam recovery does not need to be performed by using a higher layer, so that beam recovery efficiency is improved, and a service delay caused by a beam failure is also reduced.

In an optional implementation, the method further includes:

The first terminal apparatus sends a second message to the second terminal apparatus, where the second message is used to indicate an available beam in the P1 beams or indicate that none of the P1 beams is available; or if the first terminal apparatus determines that none of the P1 beams is available, the first terminal apparatus skips sending a second message to the second terminal apparatus.

After determining whether the P1 beams are available, the first terminal apparatus may send the second message to the second terminal apparatus. The second message is used to indicate the available beam in the P1 beams or indicate that none of the P1 beams is available. After the second terminal apparatus receives the second message, if the second message indicates the available beam in the P1 beams, the second terminal apparatus may determine, based on the second message, which beam in the P1 beams is available; or if the second message indicates that none of the P1 beams is available, the second terminal apparatus may determine, based on the second message, that none of the P1 beams is available. If the second message indicates the available beam in the P1 beams, a manner is that the second message includes an identifier of the available beam in the P1 beams, where the identifier of the beam is, for example, an ID of the beam or a number of the beam. The second terminal apparatus may determine, based on the identifier that is of the beam and that is included in the second message, that the beam corresponding to the identifier is the available beam. The indication is clearer by using the second message.

Alternatively, after the first terminal apparatus determines whether the P1 beams are available, if there is an available beam in the P1 beams, the first terminal apparatus may send the second message to the second terminal apparatus, where the second message is used to indicate the available beam in the P1 beams. After receiving the second message, the second terminal apparatus may determine, based on the second message, which beam in the P1 beams is available. However, if there is no available beam in the P1 beams, the first terminal apparatus may skip sending the second message to the second terminal apparatus. If the second terminal apparatus does not receive the second message from the first terminal apparatus, the second terminal apparatus may determine that none of the P1 beams is available. In this manner, a quantity of messages sent by the first terminal apparatus can be reduced, and signaling overheads can be reduced.

In an optional implementation, the method further includes the following.

The first terminal apparatus recovers one or more of the P1 beams by using an RRC layer of the first terminal apparatus.

If the first terminal apparatus determines that none of the P1 beams is available, the first terminal apparatus may notify a higher layer of the first terminal apparatus, and the higher layer of the first terminal apparatus may perform beam recovery. Likewise, if the second terminal apparatus determines that none of the P1 beams is available, the second terminal apparatus may notify a higher layer of the second terminal apparatus, and the higher layer of the second terminal apparatus may perform beam recovery. Specifically, the higher layer of the second terminal apparatus may cooperate with the higher layer of the first terminal apparatus to perform beam recovery. This is equivalent to that if a beam cannot be recovered by using the P2 second reference signals, the beam may be further recovered by using a higher layer, so that a beam recovery solution is more reliable.

In an optional implementation, that the first terminal apparatus determines that beams in the K1 directions all fail for N1 consecutive times includes the following.

The first terminal apparatus receives a first message from the second terminal apparatus, where the first message is used to indicate results of measuring the K2 first reference signals by the second terminal apparatus; and the first terminal apparatus determines, based on the measurement results of the K2 first reference signals, that the beams in the K1 directions all fail for the N1 consecutive times.

After receiving the K2 first reference signals, the second terminal apparatus may measure the K2 first reference signals, and determine, based on the measurement results, whether K1 beams fail. If the second terminal apparatus determines that the beams in the K1 directions all fail for the N1 consecutive times, the second terminal apparatus may send a BFRR to the first terminal apparatus, and the first terminal apparatus may receive the BFRR from the second terminal apparatus. The BFRR may indicate that the beams in the K1 directions all fail for the N1 consecutive times. Provided that the first terminal apparatus receives the BFRR, the first terminal apparatus may determine that the beams in the K1 directions all fail for the N1 consecutive times. Whether the beams in the K1 directions all fail for the N1 consecutive times may be determined by using the BFRR, and no other message needs to be introduced. This facilitates compatibility of a solution in a conventional technology.

Alternatively, after receiving the K2 first reference signals, the second terminal apparatus may measure the K2 first reference signals, to obtain the measurement results. The second terminal apparatus may send the first message to the first terminal apparatus, where the first message may indicate the results of measuring the K2 first reference signals by the second terminal apparatus. The first terminal apparatus may obtain the measurement results of the K2 first reference signals by receiving the first message from the second terminal apparatus. The first terminal apparatus may determine, based on the measurement results, whether the beams in the K1 directions all fail for the N1 consecutive times. Alternatively, the first message sent by the second terminal apparatus to the first terminal apparatus may not include the measurement results of the K2 first reference signals, but include first indication information. The first indication information may indicate an available beam in K1 beams, or indicate that none of the K1 beams is available. After receiving the first message from the second terminal apparatus, the first terminal apparatus may determine the available beam in the K1 beams, or determine that none of the K1 beams is available. In this manner, the first terminal apparatus and the second terminal apparatus do not need to exchange BFRRs, so that a step in a beam detection process is reduced, and the beam recovery efficiency is further improved.

In an optional implementation, the method further includes the following.

The first terminal apparatus sends M2 third reference signals to the second terminal apparatus in M1 directions, where one third reference signal in the M2 third reference signals is used to detect whether a beam in a direction in which the third reference signal is located can be used to recover a communication connection, M1 is a positive integer, and M2 is an integer greater than or equal to M1; and the first terminal apparatus determines that for N2 consecutive times, none of beams in the M1 directions can be used to recover the communication connection, where N2 is a positive integer.

The M1 directions may correspond to M1 beams, in other words, correspond to M1 transmit beams. The M1 beams may be candidate beams of the first terminal apparatus. For example, the M1 beams are all of candidate beams of the first terminal apparatus, or are a part of the candidate beams of the first terminal apparatus. In other words, if the first terminal apparatus determines that the beams in the K1 directions all fail, the third reference signals may further be sent by using the candidate beams, to determine whether the communication connection can be recovered by using the beams in the M1 directions. If the communication connection can be recovered by using the beams in the M1 directions, the first terminal apparatus may not need to further send the P2 second reference signals. However, if the communication connection cannot be recovered by using the beams in the M1 directions, the first terminal apparatus may further send the P2 second reference signals. This is equivalent to that if the communication connection cannot be recovered after various manners are tried, the P2 second reference signals may be sent in the manner provided in this embodiment of this application. In this manner, the solution in this embodiment of this application can be compatible with the conventional technology.

In an optional implementation, that the first terminal apparatus determines that the beams in the K1 directions all fail for the N1 consecutive times and determines that for the N2 consecutive times, none of the beams in the M1 directions can be used to recover the communication connection includes the following.

The first terminal apparatus receives a BFRR from the second terminal apparatus, where the BFRR indicates that the beams in the K1 directions all fail for the N1 consecutive times and that for the N2 consecutive times, none of the beams in the M1 directions can be used to recover the communication connection.

If the second terminal apparatus determines that the beams in the K1 directions all fail for the N1 consecutive times and that for the N2 consecutive times, none of the beams in the M1 directions can be used to recover the communication connection, the second terminal apparatus may send the BFRR to the first terminal apparatus, and the first terminal apparatus may receive the BFRR from the second terminal apparatus. In this case, the BFRR may indicate that the beams in the K1 directions all fail for the N1 consecutive times and indicate that for the N2 consecutive times, none of the beams in the M1 directions can be used to recover the communication connection. Provided that the first terminal apparatus receives the BFRR, the first terminal apparatus may determine that the beams in the K1 directions all fail for the N1 consecutive times and determine that for the N2 consecutive times, none of the beams in the M1 directions can be used to recover the communication connection. In this case, the second terminal apparatus only needs to send the BFRR to the first terminal apparatus, to indicate a plurality of types of information. This helps reduce a quantity of messages sent by the second terminal apparatus to the first terminal apparatus and reduce signaling overheads. In addition, the plurality of types of information are indicated by using the BFRR, so that utilization of the BFRR can also be improved.

In an optional implementation, the method further includes the following.

The first terminal apparatus sends a second response message to the second terminal apparatus, where the second response message is a response message for the BFRR.

After receiving the BFRR from the second terminal apparatus, the first terminal apparatus may send the response message for the BFRR to the second terminal apparatus, so that the second terminal apparatus knows that the first terminal apparatus receives the BFRR. This makes a communication process between the first terminal apparatus and the second terminal apparatus more reliable.

According to a second aspect, a second communication method is provided. The method includes: A second terminal apparatus receives K2 first reference signals in K1 directions corresponding to a first terminal apparatus, where each of the K1 directions is a direction in which the first terminal apparatus sends a data signal to the second terminal apparatus, one first reference signal in the K2 first reference signals is used to detect whether a beam in a direction in which the first reference signal is located fails, K1 is a positive integer, and K2 is an integer greater than or equal to K1. The second terminal apparatus sends a first message or a BFRR to the first terminal apparatus, where the first message is used to indicate results of measuring the K2 first reference signals by the second terminal apparatus, and the BFRR is used to indicate that beams in the K1 directions all fail for N1 consecutive times. The second terminal apparatus receives P2 second reference signals in P1 directions corresponding to the first terminal apparatus, where one second reference signal in the P2 second reference signals is used to measure quality of a beam in a direction in which the second reference signal is located, the P1 directions are all or a part of sending directions supported by the first terminal apparatus, P1 is a positive integer, and P2 is an integer greater than or equal to P1. The second terminal apparatus measures the P2 second reference signals. The second terminal apparatus sends measurement results of the P2 second reference signals to the first terminal apparatus, where the measurement results of the P2 second reference signals are used to determine whether there is an available beam in P1 beams.

The method may be performed by a second communication apparatus. The second communication apparatus may be a communication device or a communication apparatus, for example, a chip, that can support the communication device in implementing a function required by the method. For example, the second communication apparatus is the second terminal apparatus. For example, the second terminal apparatus is a terminal device, is a chip that is disposed in the terminal device and that is configured to implement a function of the terminal device, or is another component configured to implement the function of the terminal device. In the following description process, an example in which the second communication apparatus is the second terminal apparatus is used.

In an optional implementation, the method further includes the following.

The second terminal apparatus receives a second message from the first terminal apparatus, where the second message is used to indicate the available beam in the P1 beams or indicate that none of the P1 beams is available; or if the second terminal apparatus does not receive a second message from the first terminal apparatus, determining, by the second terminal apparatus, that none of the P1 beams is available.

In an optional implementation, the method further includes the following.

The second terminal apparatus recovers one or more of the P1 beams by using an RRC layer of the second terminal apparatus.

In an optional implementation, the method further includes the following.

The second terminal apparatus receives M2 third reference signals from the first terminal apparatus in M1 directions, where the third reference signal is used to detect whether a beam in a corresponding direction can be used to recover a communication connection, M1 is a positive integer, and M2 is an integer greater than or equal to M1.

In an optional implementation, the method further includes the following.

The second terminal apparatus sends a fourth message or the BFRR to the first terminal apparatus, where the fourth message is used to indicate results of measuring the M2 third reference signals by the second terminal apparatus, and the BFRR is further used to indicate that for N2 consecutive times, none of beams in the M1 directions can be used to recover the communication connection.

For technical effects of the second aspect or the optional implementations, refer to the descriptions of the technical effects of the first aspect or the corresponding implementations.

According to a third aspect, a third communication method is provided. The method includes: A first terminal apparatus sends K2 first reference signals to a second terminal apparatus in K1 sending directions, where each of the K1 directions is a direction in which the first terminal apparatus sends a data signal to the second terminal apparatus, one first reference signal in the K2 first reference signals is used to detect whether a beam in a sending direction in which the first reference signal is located fails, both K1 and K2 are positive integers, and K2 is greater than or equal to K1. The first terminal apparatus receives P2 second reference signals from the second terminal apparatus in P3 receiving directions, where the P3 receiving directions correspond to P1 sending directions of the first terminal apparatus, one second reference signal in the P2 second reference signals is used to measure quality of a beam in a receiving direction that is of the first terminal apparatus and in which the second reference signal is located, the quality of the beam in the receiving direction of the first terminal apparatus corresponds to quality of a beam in one sending direction of the first terminal apparatus, the P1 sending directions are a part or all of sending directions supported by the first terminal apparatus, P1 is a positive integer, and P2 is an integer greater than or equal to P3. The first terminal apparatus measures the P2 second reference signals. The first terminal apparatus determines, based on measurement results of the P2 second reference signals, whether P1 beams corresponding to the P1 sending directions are available.

The method may be performed by a third communication apparatus. The third communication apparatus may be a communication device or a communication apparatus, for example, a chip, that can support the communication device in implementing a function required by the method. For example, the third communication apparatus is the first terminal apparatus. For example, the first terminal apparatus is a terminal device, is a chip that is disposed in the terminal device and that is configured to implement a function of the terminal device, or is another component configured to implement the function of the terminal device. In the following description process, an example in which the third communication apparatus is the first terminal apparatus is used.

In this embodiment of this application, the first terminal apparatus may send the first reference signals to the second terminal apparatus, so that the first terminal apparatus can determine whether beams in the K1 sending directions fail. This is equivalent to providing a beam failure detection mechanism in SL communication. In addition, if the second terminal apparatus determines that the beams in the K1 sending directions fail, the second terminal apparatus may further send the P2 second reference signals to the first terminal apparatus, and the first terminal apparatus receives the P2 second reference signals from the second terminal apparatus in the P3 receiving directions. It may be understood as that the K1 sending directions are directions corresponding to serving beams of the first terminal apparatus, and the P3 receiving directions are a part or all of all receiving directions supported by the first terminal apparatus. The first terminal apparatus may support one or more beam correspondences. Each beam correspondence includes one transmit beam and one receive beam, and the transmit beam and the receive beam that are indicated by the beam correspondence are in a one-to-one correspondence. Therefore, P3 receive beams may correspond to P1 transmit beams of the first terminal apparatus. Then, the P3 receiving directions correspond to the P1 sending directions of the first terminal apparatus. A quantity of directions included in the P1 sending directions may be greater than a quantity of directions included in the K1 sending directions. In other words, if the beams in the K1 sending directions fail, the first terminal apparatus may continue to determine whether there is an available beam in more directions (namely, the P1 sending directions). A possibility that there is an available beam in the P1 sending directions is greater than a possibility that there is an available beam in the K1 sending directions, so that a possibility of obtaining the available beam is improved. In this manner, the available beam is determined by using a physical layer as much as possible. In other words, beam recovery is performed by using the physical layer. Beam recovery does not need to be performed by using a higher layer, so that beam recovery efficiency is improved, and a service delay caused by a beam failure is also reduced.

In an optional implementation, the method further includes the following.

The first terminal apparatus sends a first response message to the second terminal apparatus, where the first response message is used to indicate an available beam in the P1 beams or used to indicate that none of the P1 beams is available; or if the first terminal apparatus determines that none of the P1 beams is available, skipping sending, by the first terminal apparatus, a first response message to the second terminal apparatus.

After determining whether the P1 beams are available, the first terminal apparatus may send the first response message to the second terminal apparatus. The first response message is used to indicate the available beam in the P1 beams or indicate that none of the P1 beams is available. After the second terminal apparatus receives the first response message, if the first response message indicates the available beam in the P1 beams, the second terminal apparatus may determine, based on the first response message, which beam in the P1 beams is available; or if the first response message indicates that none of the P1 beams is available, the second terminal apparatus may determine, based on the first response message, that none of the P1 beams is available. The indication can be clearer by using the first response message.

Alternatively, after the first terminal apparatus determines whether the P1 beams are available, if there is an available beam in the P1 beams, the first terminal apparatus may send the first response message to the second terminal apparatus, where the first response message is used to indicate the available beam in the P1 beams. After receiving the first response message, the second terminal apparatus may determine, based on the first response message, which beam in the P1 beams is available. However, if there is no available beam in the P1 beams, the first terminal apparatus may skip sending the first response message to the second terminal apparatus. If the second terminal apparatus does not receive the first response message from the first terminal apparatus, the second terminal apparatus may determine that none of the P1 beams is available. In this manner, a quantity of messages sent by the first terminal apparatus to the second terminal apparatus can be reduced, and signaling overheads can be reduced.

In an optional implementation, the method further includes the following.

The first terminal apparatus sends M2 third reference signals to the second terminal apparatus in M1 sending directions, where one third reference signal in the M2 third reference signals is used to detect whether a beam in a sending direction in which the third reference signal is located can be used to recover a communication connection, M1 is a positive integer, and M2 is an integer greater than or equal to M1.

The M1 directions may correspond to M1 beams, in other words, correspond to M1 transmit beams. The M1 beams may be candidate beams of the first terminal apparatus. For example, the M1 beams are all of candidate beams of the first terminal apparatus, or are a part of the candidate beams of the first terminal apparatus. In other words, if the first terminal apparatus determines that the beams in the K1 directions all fail, the third reference signals may further be sent by using the candidate beams, to determine whether the communication connection can be recovered by using the beams in the M1 directions. If the communication connection can be recovered by using the beams in the M1 directions, the first terminal apparatus may not need to further send the P2 second reference signals. However, if the communication connection cannot be recovered by using the beams in the M1 directions, the first terminal apparatus may further send the P2 second reference signals. This is equivalent to that if the communication connection cannot be recovered after various manners are tried, the P2 second reference signals may be sent in the manner provided in this embodiment of this application. In this manner, the solution in this embodiment of this application can be compatible with the conventional technology.

In an optional implementation, the method further includes the following.

The first terminal apparatus recovers one or more of the P1 beams by using an RRC layer of the first terminal apparatus.

If the first terminal apparatus determines that none of the P1 beams is available, the first terminal apparatus may notify a higher layer of the first terminal apparatus, and the higher layer of the first terminal apparatus may perform beam recovery. Likewise, if the second terminal apparatus determines that none of the P1 beams is available, the second terminal apparatus may notify a higher layer of the second terminal apparatus, and the higher layer of the second terminal apparatus may perform beam recovery. Specifically, the higher layer of the second terminal apparatus may cooperate with the higher layer of the first terminal apparatus to perform beam recovery. This is equivalent to that if a beam cannot be recovered by using the P2 second reference signals, the beam may be further recovered by using a higher layer, so that a beam recovery solution is more reliable.

According to a fourth aspect, a fourth communication method is provided. The method includes: A second terminal apparatus receives K2 first reference signals in K1 sending directions corresponding to a first terminal apparatus, where each of the K1 directions is a direction in which the first terminal apparatus sends a data signal to the second terminal apparatus, one first reference signal in the K2 first reference signals is used to detect whether a beam in a sending direction in which the first reference signal is located fails, K1 is a positive integer, and K2 is an integer greater than or equal to K1. The second terminal apparatus determines that beams in the K1 sending directions all fail for N1 consecutive times, where N1 is a positive integer. The second terminal apparatus sends P2 second reference signals to the first terminal apparatus, where the P2 reference signals correspond to P1 sending directions of the first terminal apparatus, the P1 sending directions are a part or all of sending directions supported by the first terminal apparatus, one second reference signal in the P2 second reference signals is used to measure quality of a beam in a receiving direction that is of the first terminal apparatus and in which the second reference signal is located, the quality of the beam in the receiving direction of the first terminal apparatus corresponds to quality of a beam in one sending direction of the first terminal apparatus, P1 is a positive integer, and P2 is an integer greater than or equal to P3. The second terminal apparatus determines, based on the P2 second reference signals, whether P1 beams corresponding to the P1 sending directions are available.

The method may be performed by a fourth communication apparatus. The fourth communication apparatus may be a communication device or a communication apparatus, for example, a chip, that can support the communication device in implementing a function required by the method. For example, the fourth communication apparatus is the second terminal apparatus. For example, the second terminal apparatus is a terminal device, is a chip that is disposed in the terminal device and that is configured to implement a function of the terminal device, or is another component configured to implement the function of the terminal device. In the following description process, an example in which the fourth communication apparatus is the second terminal apparatus is used.

In an optional implementation, that the second terminal apparatus determines, based on the P2 second reference signals, whether P1 beams corresponding to the P1 sending directions are available includes the following.

The second terminal apparatus receives a first response message from the first terminal apparatus, where the first response message is used to indicate an available beam in the P1 beams or used to indicate that none of the P1 beams is available; or if the second terminal apparatus does not receive a first response message from the first terminal apparatus, the second terminal apparatus determines that none of the P1 beams is available.

In an optional implementation, the method further includes the following.

The second terminal apparatus receives M2 third reference signals in M1 sending directions corresponding to the first terminal apparatus, where one third reference signal in the M2 third reference signals is used to detect whether a beam in a sending direction in which the third reference signal is located can be used to recover a communication connection, M1 is a positive integer, and M2 is an integer greater than or equal to M1; and the second terminal apparatus determines that for N2 consecutive times, none of beams in the M1 sending directions can be used to recover the communication connection, where N2 is a positive integer.

In an optional implementation, the method further includes the following.

The second terminal apparatus recovers one or more of the P1 beams by using an RRC layer of the second terminal apparatus.

For technical effects of the fourth aspect or the optional implementations, refer to the descriptions of the technical effects of the third aspect or the corresponding implementations.

According to a fifth aspect, a communication apparatus is provided. For example, the communication apparatus is the foregoing first communication apparatus. The first communication apparatus is configured to perform the method according to any one of the first aspect or the possible implementations. Specifically, the first communication apparatus may include a module configured to perform the method according to any one of the first aspect or the possible implementations, for example, include a processing module and a transceiver module. For example, the transceiver module may include a sending module and a receiving module. The sending module and the receiving module may be different function modules, or may be a same function module that can implement different functions. For example, the first communication apparatus is a first terminal apparatus. For example, the first terminal apparatus is a communication device, or is a chip or another component disposed in the communication device. For example, the communication device is a terminal device. The following uses an example in which the first communication apparatus is the first terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the first terminal apparatus is the communication device, the transceiver is implemented, for example, by using an antenna, a feeder, and a codec in the communication device. Alternatively, if the first terminal apparatus is the chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the fifth aspect, that the first communication apparatus is the first terminal apparatus, the processing module, and the transceiver module are still used as an example for description.

The transceiver module is configured to send K2 first reference signals to a second terminal apparatus in K1 directions, where each of the K1 directions is a direction in which the first terminal apparatus sends a data signal to the second terminal apparatus, one first reference signal in the K2 first reference signals is used to detect whether a beam in a direction in which the first reference signal is located fails, both K1 and K2 are positive integers, and K2 is greater than or equal to K1.

The processing module is configured to determine that beams in the K1 directions all fail for N1 consecutive times, where N1 is a positive integer.

The transceiver module is further configured to send P2 second reference signals to the second terminal apparatus in P1 directions, where one second reference signal in the P2 second reference signals is used to measure quality of a beam in a direction in which the first reference signal is located, the P1 directions are a part or all of sending directions supported by the first terminal apparatus, P1 is a positive integer, and P2 is an integer greater than or equal to P1.

The transceiver module is further configured to receive measurement results that are of the P2 second reference signals and that are from the second terminal apparatus.

The processing module is further configured to determine, based on the measurement results of the P2 second reference signals, whether P1 beams corresponding to the P1 directions are available.

In an optional implementation, the transceiver module is further configured to send a second message to the second terminal apparatus, where the second message is used to indicate an available beam in the P1 beams or indicate that none of the P1 beams is available; or the processing module is further configured to: when determining that none of the P1 beams is available, control the transceiver module to skip sending a second message to the second terminal apparatus.

In an optional implementation, the processing module is further configured to recover one or more of the P1 beams by using an RRC layer of the first terminal apparatus.

The processing module is configured to determine, in the following manner, that the beams in the K1 directions all fail for the N1 consecutive times: receiving a first message from the second terminal apparatus by using the transceiver module, where the first message is used to indicate results of measuring the K2 first reference signals by the second terminal apparatus; and determining, based on the measurement results of the K2 first reference signals, that the beams in the K1 directions all fail for the N1 consecutive times.

In an optional implementation, the transceiver module is further configured to send M2 third reference signals to the second terminal apparatus in M1 directions, where one third reference signal in the M2 third reference signals is used to detect whether a beam in a direction in which the third reference signal is located can be used to recover a communication connection, M1 is a positive integer, and M2 is an integer greater than or equal to M1; and the processing module is further configured to determine that for N2 consecutive times, none of beams in the M1 directions can be used to recover the communication connection, where N2 is a positive integer.

In an optional implementation, the processing module is configured to: in the following manner, determine that the beams in the K1 directions all fail for the N1 consecutive times and determine that for the N2 consecutive times, none of the beams in the M1 directions can be used to recover the communication connection: receiving, by using the transceiver module, a BFRR from the second terminal apparatus, where the BFRR indicates that the beams in the K1 directions all fail for the N1 consecutive times and that for the N2 consecutive times, none of the beams in the M1 directions can be used to recover the communication connection.

In an optional implementation, the transceiver module is further configured to send a second response message to the second terminal apparatus, where the second response message is a response message for the BFRR.

For technical effects of the fifth aspect or the optional implementations, refer to the descriptions of the technical effects of the first aspect or the corresponding implementations.

According to a sixth aspect, a communication apparatus is provided. For example, the communication apparatus is the foregoing second communication apparatus. The second communication apparatus is configured to perform the method according to any one of the second aspect or the possible implementations. Specifically, the second communication apparatus may include a module configured to perform the method according to any one of the second aspect or the possible implementations, for example, include a processing module and a transceiver module. For example, the transceiver module may include a sending module and a receiving module. The sending module and the receiving module may be different function modules, or may be a same function module that can implement different functions. For example, the second communication apparatus is a second terminal apparatus. For example, the second terminal apparatus is a communication device, or is a chip or another component disposed in the communication device. For example, the communication device is a terminal device. The following uses an example in which the second communication apparatus is the second terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the second terminal apparatus is the communication device, the transceiver is implemented, for example, by using an antenna, a feeder, and a codec in the communication device. Alternatively, if the second terminal apparatus is the chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the sixth aspect, that the second communication apparatus is the second terminal apparatus, the processing module, and the transceiver module are still used as an example for description.

The transceiver module is configured to receive K2 first reference signals in K1 directions corresponding to a first terminal apparatus, where each of the K1 directions is a direction in which the first terminal apparatus sends a data signal to the second terminal apparatus, one first reference signal in the K2 first reference signals is used to detect whether a beam in a direction in which the first reference signal is located fails, K1 is a positive integer, and K2 is an integer greater than or equal to K1.

The second terminal apparatus sends a first message or a BFRR to the first terminal apparatus, where the first message is used to indicate results of measuring the K2 first reference signals by the second terminal apparatus, and the BFRR is used to indicate that beams in the K1 directions all fail for N1 consecutive times.

The transceiver module is further configured to receive P2 second reference signals in P1 directions corresponding to the first terminal apparatus, where one second reference signal in the P2 second reference signals is used to measure quality of a beam in a direction in which the second reference signal is located, the P1 directions are all or a part of sending directions supported by the first terminal apparatus, P1 is a positive integer, and P2 is an integer greater than or equal to P1.

The processing module is configured to measure the P2 second reference signals.

The transceiver module is further configured to send measurement results of the P2 second reference signals to the first terminal apparatus, where the measurement results of the P2 second reference signals are used to determine whether there is an available beam in P1 beams.

In an optional implementation, the transceiver module is further configured to receive a second message from the first terminal apparatus, where the second message is used to indicate the available beam in the P1 beams or indicate that none of the P1 beams is available; or the processing module is further configured to: when determining that the transceiver module does not receive a second message from the first terminal apparatus, determine that none of the P1 beams is available.

In an optional implementation, the processing module is further configured to recover one or more of the P1 beams by using an RRC layer of the second terminal apparatus.

In an optional implementation, the transceiver module is further configured to receive M2 third reference signals from the first terminal apparatus in M1 directions, where the third reference signal is used to detect whether a beam in a corresponding direction can be used to recover a communication connection, M1 is a positive integer, and M2 is an integer greater than or equal to M1.

In an optional implementation, the transceiver module is further configured to send a fourth message or the BFRR to the first terminal apparatus, where the fourth message is used to indicate results of measuring the M2 third reference signals by the second terminal apparatus, and the BFRR is further used to indicate that for N2 consecutive times, none of beams in the M1 directions can be used to recover the communication connection.

For technical effects of the sixth aspect or the optional implementations, refer to the descriptions of the technical effects of the third aspect or the corresponding implementations.

According to a seventh aspect, a communication apparatus is provided. For example, the communication apparatus is the foregoing third communication apparatus. The third communication apparatus is configured to perform the method according to any one of the third aspect or the possible implementations. Specifically, the third communication apparatus may include a module configured to perform the method according to any one of the third aspect or the possible implementations, for example, include a processing module and a transceiver module. For example, the transceiver module may include a sending module and a receiving module. The sending module and the receiving module may be different function modules, or may be a same function module that can implement different functions. For example, the third communication apparatus is a first terminal apparatus. For example, the first terminal apparatus is a communication device, or is a chip or another component disposed in the communication device. For example, the communication device is a terminal device. The following uses an example in which the third communication apparatus is the first terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the first terminal apparatus is the communication device, the transceiver is implemented, for example, by using an antenna, a feeder, and a codec in the communication device. Alternatively, if the first terminal apparatus is the chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the seventh aspect, that the third communication apparatus is the first terminal apparatus, the processing module, and the transceiver module are still used as an example for description.

The transceiver module is configured to send K2 first reference signals to a second terminal apparatus in K1 sending directions, where each of the K1 directions is a direction in which the first terminal apparatus sends a data signal to the second terminal apparatus, one first reference signal in the K2 first reference signals is used to detect whether a beam in a sending direction in which the first reference signal is located fails, both K1 and K2 are positive integers, and K2 is greater than or equal to K1.

The transceiver module is further configured to receive P2 second reference signals from the second terminal apparatus in P3 receiving directions, where the P3 receiving directions correspond to P1 sending directions of the first terminal apparatus, one second reference signal in the P2 second reference signals is used to measure quality of a beam in a receiving direction that is of the first terminal apparatus and in which the second reference signal is located, the quality of the beam in the receiving direction of the first terminal apparatus corresponds to quality of a beam in one sending direction of the first terminal apparatus, the P1 sending directions are a part or all of sending directions supported by the first terminal apparatus, P1 is a positive integer, and P2 is an integer greater than or equal to P3.

The processing module is configured to measure the P2 second reference signals.

The processing module is further configured to determine, based on measurement results of the P2 second reference signals, whether P1 beams corresponding to the P1 sending directions are available.

In an optional implementation, the transceiver module is further configured to send a first response message to the second terminal apparatus, where the first response message is used to indicate an available beam in the P1 beams or used to indicate that none of the P1 beams is available; or the processing module is further configured to: when determining that none of the P1 beams is available, control the transceiver module to skip sending a first response message to the second terminal apparatus.

In an optional implementation, the transceiver module is further configured to send M2 third reference signals to the second terminal apparatus in M1 sending directions, where one third reference signal in the M2 third reference signals is used to detect whether a beam in a sending direction in which the third reference signal is located can be used to recover a communication connection, M1 is a positive integer, and M2 is an integer greater than or equal to M1.

In an optional implementation, the processing module is further configured to recover one or more of the P1 beams by using an RRC layer of the first terminal apparatus.

For technical effects of the seventh aspect or the optional implementations, refer to the descriptions of the technical effects of the third aspect or the corresponding implementations.

According to an eighth aspect, a communication apparatus is provided. For example, the communication apparatus is the foregoing fourth communication apparatus. The fourth communication apparatus is configured to perform the method according to any one of the fourth aspect or the possible implementations. Specifically, the fourth communication apparatus may include a module configured to perform the method according to any one of the fourth aspect or the possible implementations, for example, include a processing module and a transceiver module. For example, the transceiver module may include a sending module and a receiving module. The sending module and the receiving module may be different function modules, or may be a same function module that can implement different functions. For example, the fourth communication apparatus is a second terminal apparatus. For example, the second terminal apparatus is a communication device, or is a chip or another component disposed in the communication device. For example, the communication device is a terminal device. The following uses an example in which the fourth communication apparatus is the second terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the second terminal apparatus is the communication device, the transceiver is implemented, for example, by using an antenna, a feeder, and a codec in the communication device. Alternatively, if the second terminal apparatus is the chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the eighth aspect, that the fourth communication apparatus is the second terminal apparatus, the processing module, and the transceiver module are still used as an example for description.

The transceiver module is configured to receive K2 first reference signals in K1 sending directions corresponding to a first terminal apparatus, where each of the K1 directions is a direction in which the first terminal apparatus sends a data signal to the second terminal apparatus, one first reference signal in the K2 first reference signals is used to detect whether a beam in a sending direction in which the first reference signal is located fails, K1 is a positive integer, and K2 is an integer greater than or equal to K1.

The processing module is configured to determine that beams in the K1 sending directions all fail for N1 consecutive times, where N1 is a positive integer.

The transceiver module is further configured to send P2 second reference signals to the first terminal apparatus, where the P2 reference signals correspond to P1 sending directions of the first terminal apparatus, the P1 sending directions are a part or all of sending directions supported by the first terminal apparatus, one second reference signal in the P2 second reference signals is used to measure quality of a beam in a receiving direction that is of the first terminal apparatus and in which the second reference signal is located, the quality of the beam in the receiving direction of the first terminal apparatus corresponds to quality of a beam in one sending direction of the first terminal apparatus, P1 is a positive integer, and P2 is an integer greater than or equal to P3.

The processing module is further configured to determine, based on the P2 second reference signals, whether P1 beams corresponding to the P1 sending directions are available.

In an optional implementation, the processing module is configured to determine, based on the P2 second reference signals in the following manner, whether the P1 beams corresponding to the P1 sending directions are available: receiving a first response message from the first terminal apparatus by using the transceiver module, where the first response message is used to indicate an available beam in the P1 beams or used to indicate that none of the P1 beams is available; or if it is determined that a first response message from the first terminal apparatus is not received by using the transceiver module, determining that none of the P1 beams is available.

In an optional implementation, the transceiver module is further configured to receive M2 third reference signals in M1 sending directions corresponding to the first terminal apparatus, where one third reference signal in the M2 third reference signals is used to detect whether a beam in a sending direction in which the third reference signal is located can be used to recover a communication connection, M1 is a positive integer, and M2 is an integer greater than or equal to M1; and the processing module is further configured to determine that for N2 consecutive times, none of beams in the M1 sending directions can be used to recover the communication connection, where N2 is a positive integer.

In an optional implementation, the processing module is further configured to recover one or more of the P1 beams by using an RRC layer of the second terminal apparatus.

For technical effects of the eighth aspect or the optional implementations, refer to the descriptions of the technical effects of the fourth aspect or the corresponding implementations.

According to a ninth aspect, a communication apparatus is provided. The communication apparatus is, for example, the foregoing first communication apparatus. The communication apparatus includes a processor. Optionally, the communication apparatus may further include a memory, configured to store computer instructions. The processor and the memory are coupled to each other, and are configured to implement the method according to the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, and are configured to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a first terminal apparatus. For example, the first terminal apparatus is a communication device, or is a chip or another component disposed in the communication device. For example, the communication device is a terminal device.

If the first communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the first communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to a tenth aspect, a communication apparatus is provided. The communication apparatus is, for example, the foregoing second communication apparatus. The communication apparatus includes a processor. Optionally, the communication apparatus may further include a memory, configured to store computer instructions. The processor and the memory are coupled to each other, and are configured to implement the method according to the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, and are configured to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a second terminal apparatus. For example, the second terminal apparatus is a communication device, or is a chip or another component disposed in the communication device. For example, the communication device is a terminal device.

If the second communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the second communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to an eleventh aspect, a communication apparatus is provided. The communication apparatus is, for example, the foregoing third communication apparatus. The communication apparatus includes a processor. Optionally, the communication apparatus may further include a memory, configured to store computer instructions. The processor and the memory are coupled to each other, and are configured to implement the method according to the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, and are configured to implement the method according to the third aspect or the possible implementations. For example, when the processor executes the computer instructions stored in the memory, the third communication apparatus is enabled to perform the method according to any one of the third aspect or the possible implementations. For example, the third communication apparatus is a first terminal apparatus. For example, the first terminal apparatus is a communication device, or is a chip or another component disposed in the communication device. For example, the communication device is a terminal device.

If the third communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the third communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to a twelfth aspect, a communication apparatus is provided. The communication apparatus is, for example, the foregoing fourth communication apparatus. The communication apparatus includes a processor. Optionally, the communication apparatus may further include a memory, configured to store computer instructions. The processor and the memory are coupled to each other, and are configured to implement the method according to the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, and are configured to implement the method according to the fourth aspect or the possible implementations. For example, when the processor executes the computer instructions stored in the memory, the second communication apparatus is enabled to perform the method according to any one of the fourth aspect or the possible implementations. For example, the fourth communication apparatus is a second terminal apparatus. For example, the second terminal apparatus is a communication device, or is a chip or another component disposed in the communication device. For example, the communication device is a terminal device.

If the fourth communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the fourth communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to a thirteenth aspect, a communication system is provided. The communication system includes the communication apparatus according to the fifth aspect or the communication apparatus according to the ninth aspect, and includes the communication apparatus according to the sixth aspect or the communication apparatus according to the tenth aspect.

According to a fourteenth aspect, a communication system is provided. The communication system includes the communication apparatus according to the seventh aspect or the communication apparatus according to the eleventh aspect, and includes the communication apparatus according to the eighth aspect or the communication apparatus according to the twelfth aspect.

According to a fifteenth aspect, a computer-readable storage medium is provided. The computer-readable storage medium is configured to store computer instructions. When the computer instructions are run on a computer, the computer is enabled to perform the method according to any one of the first aspect or the possible implementations.

According to a sixteenth aspect, a computer-readable storage medium is provided. The computer-readable storage medium is configured to store computer instructions. When the computer instructions are run on a computer, the computer is enabled to perform the method according to any one of the second aspect or the possible implementations.

According to a seventeenth aspect, a computer-readable storage medium is provided. The computer-readable storage medium is configured to store computer instructions. When the computer instructions are run on a computer, the computer is enabled to perform the method according to any one of the third aspect or the possible implementations.

According to an eighteenth aspect, a computer-readable storage medium is provided. The computer-readable storage medium is configured to store computer instructions. When the computer instructions are run on a computer, the computer is enabled to perform the method according to any one of the fourth aspect or the possible implementations.

According to a nineteenth aspect, a computer program product including instructions is provided. The computer program product is configured to store computer instructions. When the computer instructions are run on a computer, the computer is enabled to perform the method according to any one of the first aspect or the possible implementations.

According to a twentieth aspect, a computer program product including instructions is provided. The computer program product is configured to store computer instructions. When the computer instructions are run on a computer, the computer is enabled to perform the method according to any one of the second aspect or the possible implementations.

According to a twenty-first aspect, a computer program product including instructions is provided. The computer program product is configured to store computer instructions. When the computer instructions are run on a computer, the computer is enabled to perform the method according to any one of the third aspect or the possible implementations.

According to a twenty-second aspect, a computer program product including instructions is provided. The computer program product is configured to store computer instructions. When the computer instructions are run on a computer, the computer is enabled to perform the method according to any one of the fourth aspect or the possible implementations.

Embodiments of this application provide the beam failure detection mechanism in the SL communication. In addition, in embodiments of this application, the available beam may be determined by using the physical layer as much as possible. In other words, beam recovery is performed by using the physical layer. Beam recovery does not need to be performed by using the higher layer, so that the beam recovery efficiency is improved, and the service delay caused by the beam failure is also reduced.

DETAILED DESCRIPTION OF ILLUSTRATIVE EMBODIMENTS

Figure 1:
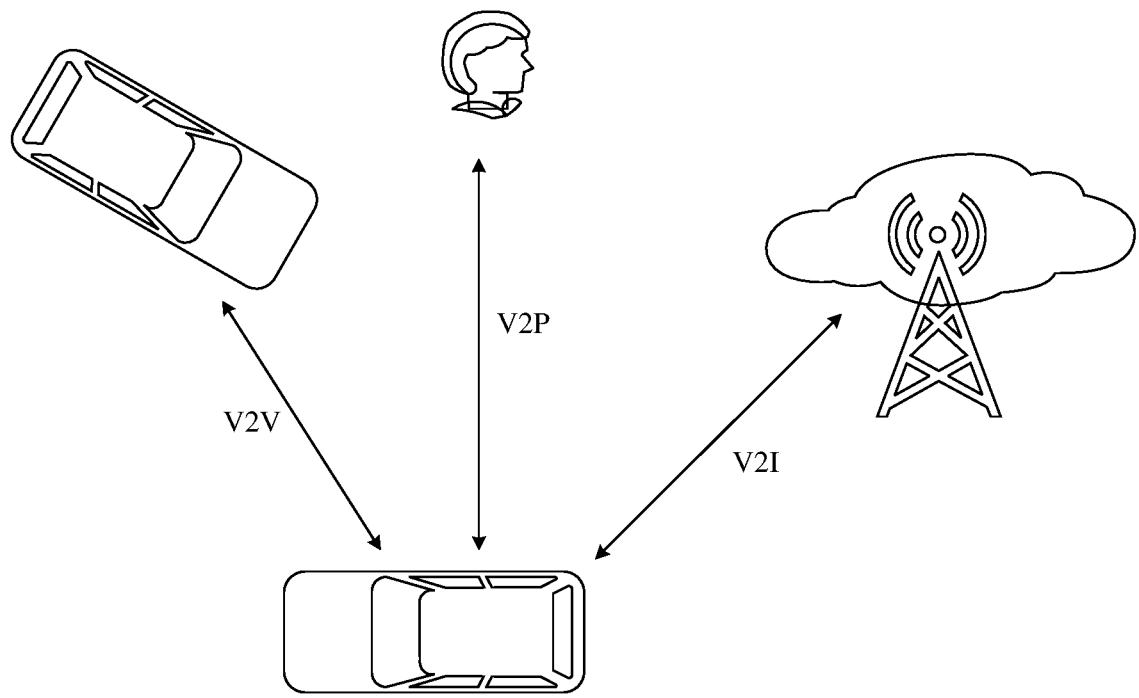
FIG. 1 is a schematic diagram of several types of V2X.

To make objectives, technical solutions, and advantages of embodiments of this application clearer, the following further describes embodiments of this application in detail with reference to accompanying drawings.

The following describes some terms in embodiments of this application, to facilitate understanding of a person skilled in the art.

(1) A terminal device may include a device that provides a voice and/or data connectivity for a user. Specifically, the terminal device includes a device that provides the voice for the user, includes a device that provides the data connectivity for the user, or includes a device that provides the voice and the data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange the voice and the data with the RAN. The terminal device may include user equipment (UE), a wireless terminal device, a mobile terminal device, a device-to-device (D2D) communication terminal device, a vehicle to everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, for example, a device such as a personal communications service (PCS) phone, a cordless telephone set, a session initiation protocol (SIP) phone, a wireless local loop (WLL) station, or a personal digital assistant (PDA). The terminal apparatus further includes a limited device, for example, a device with low power consumption, a device with a limited storage capability, or a device with a limited computing capability. For example, the terminal apparatus includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is directly worn, or is a portable device integrated into clothes or an accessory of the user. The wearable device is more than a hardware device. The wearable device implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on board units (OBU). The terminal device in embodiments of this application may alternatively be an in-vehicle module, an onboard component, an automotive chip, or an on board unit that is built in a vehicle as one or more components or units. The vehicle may implement a method in embodiments of this application by using the in-vehicle module, the onboard component, the automotive chip, or the on board unit that is built in the vehicle.

In embodiments of this application, the terminal device may further include a relay (relay). Alternatively, it may be understood as that any device that can perform data communication with a base station may be considered as the terminal device.

A terminal apparatus may be the terminal device, or may be a module configured to implement a function of the terminal device. The module may be disposed in the terminal device, or may be disposed independently of the terminal device. For example, the module is a chip.

(2) V2X refers to interconnection between a vehicle and the outside, and is a basic and key technology of a future intelligent vehicle, autonomous driving, and an intelligent transportation system. V2X optimizes a specific application requirement of V2X based on an existing device-to-device (D2D) technology. This requires that an access delay of a V2X device be further reduced and a resource collision problem be resolved.

V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction. As shown in FIG. 1, V2V refers to communication between vehicles, V2P refers to communication between a vehicle and a person (including a pedestrian, a bicycle rider, a driver, or a passenger), and V2I refers to communication between the vehicle and a network device such as an RSU. In addition, V2N may be included in V2I. V2N refers to communication between the vehicle and a base station/a network.

V2P may be used for safety warning for the pedestrian or a non-motor vehicle on a road. The vehicle may communicate, through V2I, with a road or even another infrastructure such as a traffic light or a road barrier, to obtain road management information such as a traffic light signal time sequence. V2V may be used for information exchange and reminding between the vehicles, and a most typical application is an anti-collision safety system between the vehicles. V2N is a most widely used form of an internet of vehicles currently, and a main function of V2N is to enable the vehicle to connect to a cloud server through a mobile network, to use an application function, for example, navigation, entertainment, or anti-theft, provided by the cloud server.

In V2X, communication is mainly performed between terminal devices. For a transmission mode between the terminal devices, a current standard protocol supports a broadcast manner, a multicast manner, and a unicast manner.

Broadcast manner: The broadcast manner means that a terminal device used as a transmit end sends data in a broadcast mode, and a plurality of terminal devices can all receive sidelink control information (SCI) or a sidelink shared channel (SSCH) from the transmit end.

On a sidelink, a manner of ensuring that all terminal devices parse the control information from the transmit end is that the transmit end does not scramble the control information or that the transmit end scrambles the control information by using a scrambling code known to all the terminal devices.

Multicast manner: The multicast manner is similar to the broadcast manner. The terminal device used as the transmit end sends data in the broadcast mode. A group of terminal devices can all parse the SCI or the SSCH.

Unicast manner: In the unicast manner, one terminal device sends data to the other terminal device, and another terminal device does not need to or cannot parse the data.

(3) Beam management is an important technology proposed in 5G NR for FR2, and refers to a process in which a gNodeB (gNB) and UE obtain and maintain a beam set used for sending and receiving. The beam management includes two important functions: beam training and beam failure recovery (BFR). The BFR refers to a process in which after obtaining, through detection according to a BFD criterion configured by the gNB, that a serving beam fails, the UE attempts to replace the serving beam with an available candidate beam, so that a transmit and receive beam pair becomes available again. For an NR Uu interface, the serving beam is a beam that transmits a wanted signal between the gNB and the UE. The wanted signal includes a data signal, and further includes a reference signal used to perform BFD. The candidate beam is a beam that does not transmit the wanted signal but transmits a reference signal between the gNB and the UE to measure quality.

(4) In embodiments of this application, detection of a beam between terminal apparatuses is mainly used as an example for description. When another beam needs to be detected, the following first terminal apparatus and the following second terminal apparatus should be correspondingly replaced with apparatuses in corresponding scenarios. For example, to detect a beam between a base station and a terminal apparatus, if downlink beam detection is performed, the first terminal apparatus may be replaced with the base station, and the second terminal apparatus may be the second terminal apparatus; or if uplink beam detection is performed, the first terminal apparatus may be the first terminal apparatus, and the second terminal apparatus may be replaced with the base station. For another example, to detect a beam between a road side unit (RSU) and the terminal apparatus, if downlink beam detection is performed, the first terminal apparatus may be replaced with the RSU, and the second terminal apparatus may be the second terminal apparatus, if uplink beam detection is performed, the first terminal apparatus may be the first terminal apparatus, and the second terminal apparatus may be replaced with the RSU.

(5) Terms "system" and "network" may be used interchangeably in embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, a first reference signal and a second reference signal are merely intended to distinguish between different reference signals, but do not necessarily indicate that the two types of reference signals are different in content, priorities, a sending sequence, importance, or the like.

The foregoing describes some concepts in embodiments of this application. The following describes technical features in embodiments of this application.

A BFD method and a BFR method on the NR Uu interface are described first.

① BFD. Currently, a condition of BFD is as follows: All serving beams of a gNB are considered as failures for N consecutive times. For descriptions of the serving beam, refer to the foregoing descriptions. N is indicated by a beam failure instance maximum count (beam failure instance max count) field in radio resource control (RRC) signaling. A criterion for considering the serving beam as a failure is that a hypothetical physical downlink control channel (PDCCH) block error rate (BLER) corresponding to a reference signal received power (RSRP) of a reference signal transmitted in the serving beam and used to detect a beam failure is greater than a given threshold that is a default BLER threshold used for declaration of being out-of-sync (out-of-sync) in radio link monitoring (RLM).

② Identification of a new candidate beam means that the gNB sends reference signals in a series of candidate beams, to help UE select a candidate beam from the candidate beams as a new serving beam, to recover a transmit and receive beam pair of a connection. The reference signal sent by the gNB in the candidate beam is, for example, a channel state information reference signal (CSI-RS) or a synchronization signal block (SSB). A specific reference signal is indicated by a candidate beam reference signal list (candidate beam RS list) field in RRC signaling. When finding that an RSRP of the reference signal sent in the candidate beam is greater than a configured threshold, the UE considers that the corresponding candidate beam is available, that is, the candidate beam may be used as the new serving beam. The threshold is explicitly or implicitly indicated by an RSRP-threshold SSB (rsrp-threshold SSB) field in the RRC signaling.

Step ① may occur before step ②, step ① may occur after step ②, or step ① and step ② may occur simultaneously.

③ The UE sends a beam failure recovery request (BFRR) to the gNB, and the gNB receives the BFRR from the UE. The UE sends the BFRR mainly on a physical random access channel (PRACH), or may send the BFRR in a scanning manner on a physical uplink control channel (PUCCH). If the UE identifies that there is an available candidate beam, the BFRR includes information about the available candidate beam. If the UE does not identify an available candidate beam, the UE skips sending the BFRR. If the UE skips sending the BFRR, the UE notifies a higher layer of the UE, to indicate that the UE is in a beam failure state. In addition, if the UE skips sending the BFRR, the gNB cannot receive the BFRR from the UE, and the gNB also notify a higher layer of the gNB, to indicate that the gNB is in a beam failure state. The higher layer of the UE and the higher layer of the gNB may perform beam recovery.

④ The UE monitors a response from the gNB to the BFRR. If the UE sends the BFRR to the gNB, the UE may start a time window within which the UE monitors the response from the gNB to the BFRR. If the UE receives the response from the gNB within the time window, the UE determines that BFR is successful. If the UE does not receive the response from the gNB within the time window, the UE may send the BFRR again. When the UE still does not receive the response from the gNB after repeatedly sending the BFRR for a specific quantity of times, the UE notifies the higher layer of the UE, to indicate that the UE is in the beam failure state. The higher layer of the UE and the higher layer of the gNB may perform beam recovery.

The foregoing descriptions are merely the BFD method and the BFR method on the NR Uu interface. There has been no BFD method or BFR method in SL communication yet. In addition, for the gNB, there may be a plurality of optional transmit beams, and a serving beam and a candidate beam are only a part of the optional transmit beams. The BFD method and the BFR method on the NR Uu interface are used as an example. It can be learned that when determining both the serving beam and the candidate beam fail, the UE hands over a beam recovery process to the higher layer for processing. For the NR Uu interface, there is a node, namely, the gNB. The gNB continuously sends SSBs. If the higher layer performs beam recovery, the higher layer may use the SSBs as reference signals to perform beam recovery. Even if the UE fails to recover a beam by using the BFD method and the BFR method described above, and the higher layer performs beam recovery, because the SSBs are continuously sent, the higher layer of the UE may obtain the SSBs in a short time, to complete beam recovery. However, there is no node continuously sending reference signals on a sidelink. If the higher layer performs beam recovery, the higher layer may obtain, in a long time, no reference signal used for beam recovery. Consequently, beam recovery efficiency is low, and even beam recovery may not be completed.

In view of this, the technical solutions in embodiments of this application are provided. In embodiments of this application, a first terminal apparatus may send first reference signals to a second terminal apparatus, so that the first terminal apparatus can determine whether beams in K1 directions fail. This is equivalent to providing a beam failure detection mechanism in SL communication. In addition, if the first terminal apparatus determines that the beams in the K1 directions fail, the first terminal apparatus may further send P2 second reference signals to the second terminal apparatus in P1 directions. It may be understood as that the K1 directions are directions corresponding to serving beams of the first terminal apparatus, and the P1 directions are a part or all of sending directions supported by the first terminal apparatus. A quantity of directions included in the P1 directions may be greater than a quantity of directions included in the K1 directions. In other words, if the beams in the K1 directions fail, the first terminal apparatus may continue to determine whether there is an available beam in more directions (namely, the P1 directions). A possibility that there is an available beam in the P1 directions is greater than a possibility that there is an available beam in the K1 directions, so that a possibility of obtaining the available beam is improved. In this manner, the available beam is determined by using a physical layer as much as possible. In other words, beam recovery is performed by using the physical layer. Beam recovery does not need to be performed by using a higher layer, so that beam recovery efficiency is improved, and a service delay caused by a beam failure is also reduced.

The technical solutions provided in embodiments of this application may be applied to a D2D scenario that may be an NR D2D scenario, an LTE D2D scenario, or the like; may be applied to a V2X scenario that may be an NR V2X scenario, an LTE V2X scenario, or the like; or may be applied to another scenario or another communication system, for example, may be used for beam detection on a Uu interface in an LTE system or an NR system.

Figure 2:
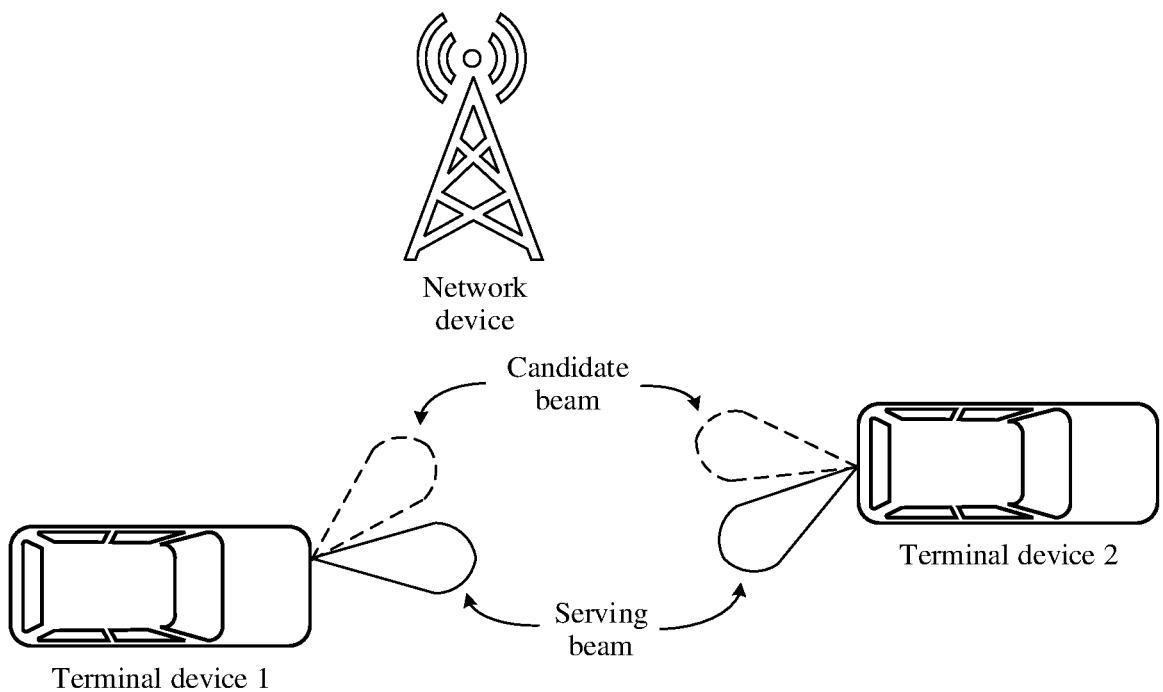
FIG. 2 is a schematic diagram of an application scenario according to an embodiment of this application.

The following describes a network architecture used in an embodiment of this application. FIG. 2 shows a network architecture used in an embodiment of this application.

A network device and two terminal devices are included in FIG. 2. The two terminal devices are a terminal device 1 and a terminal device 2. For example, the terminal device 1 is a terminal device at a transmit end, and the terminal device 2 is a terminal device at a receive end. Both the two terminal devices may be connected to the network device. Alternatively, for the two terminal devices, only the terminal device 1 may be connected to the network device, and the terminal device 2 is not connected to the network device. The two terminal devices may communicate with each other through an SL. For example, the terminal device 1 may send data to the terminal device 2 by using a serving beam, or may send a reference signal to the terminal device 2 by using a candidate beam. Certainly, a quantity of terminal devices in FIG. 2 is merely an example. During actual application, the network device may provide services for a plurality of terminal devices.

The network device in FIG. 2 is, for example, an access network device such as a base station. The access network device corresponds to different devices in different systems. For example, the access network device may correspond to an eNB in a 4G system, corresponds to an access network device such as a gNB in 5G in a 5G system, or is an access network device in a subsequently evolved communication system.

That the terminal device in FIG. 2 is a vehicle-mounted terminal device or a vehicle is used as an example. However, a terminal device in embodiments of this application is not limited thereto.

The following describes the technical solutions provided in embodiments of this application with reference to the accompanying drawings. In embodiments of this application, a concept of a beam "failure" is involved. The concept is first described herein.

Beam-failure instance: A terminal apparatus receives, from a base station (for example, a gNB), a reference signal that is quasi co-located (QCL) with a PDCCH. The terminal device measures an RSRP of the reference signal. If a hypothetical PDCCH BLER corresponding to the measured RSRP is greater than a given threshold, it is considered that one beam-failure instance occurs.

An essence of the definition of the beam-failure instance is actually that when attention is paid to communication quality, attention is always paid to whether control signals in a control channel can be successfully transmitted to a receive end. If none of the control signals can be received by a receive end at a low BLER, the connection may be considered as a failure. "Being quasi co-located with a PDCCH" indicates that a channel that the reference signal passes through is the same as the channel that the control signals pass through. If the RSRP of the reference signal is quite low, a low signal-to-noise ratio is naturally caused, and a quite high BLER is also caused. Quality of the PDCCH may be determined by converting the RSRP of the reference signal into the hypothetical BLER and then comparing the hypothetical BLER with the given threshold.

If the concept is converted into a sidelink, for example, a second terminal apparatus receives, from a first terminal apparatus, a reference signal that is quasi co-located with a physical sidelink control channel (PSCCH), the second terminal apparatus measures an RSRP of the reference signal. If a hypothetical PSCCH BLER corresponding to the measured RSRP is greater than a given threshold, it is considered that one beam-failure instance occurs.

Beam failure: If a quantity of consecutive beam-failure instances is greater than or equal to a given quantity of times, it is considered that a beam fails.

In addition, a concept of a beam "available" is further involved in embodiments of this application. For example, in embodiments of this application, that a beam (for example, a transmit beam) of the first terminal apparatus is available may mean that the beam may be used to send a data signal to the second terminal apparatus.

Figure 3:
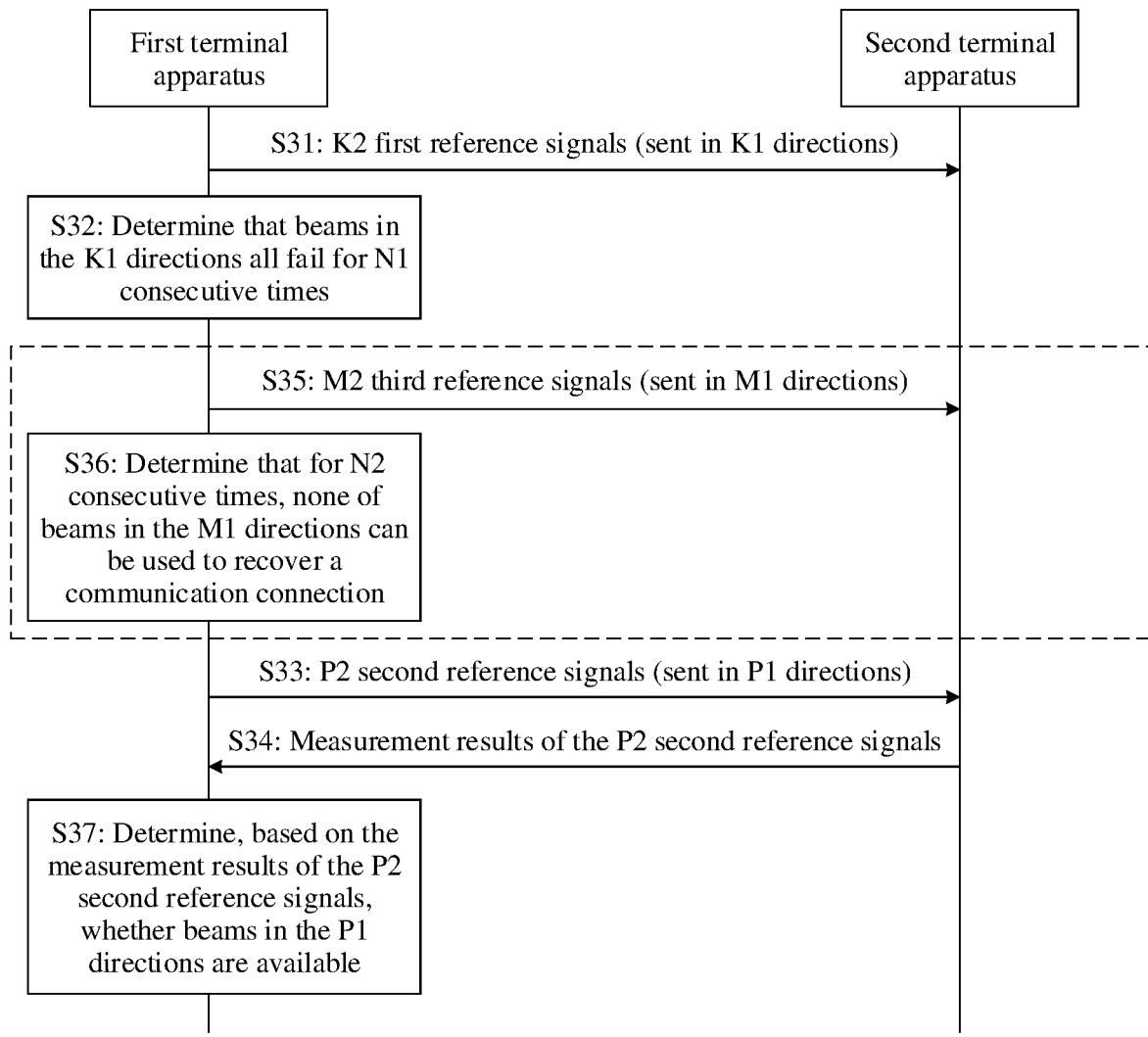
FIG. 3 is a flowchart of a first communication method according to an embodiment of this application.

An embodiment of this application provides a first communication method. FIG. 3 is a flowchart of the method. In the following description process, an example in which the method is applied to the network architecture shown in FIG. 2 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device in implementing a function required by the method, may be a terminal device or a communication apparatus that can support the terminal device in implementing a function required by the method, or certainly may be another communication apparatus, for example, a chip. In addition, an implementation of the first communication apparatus or the second communication apparatus is not limited. For example, the two communication apparatuses may be implemented in a same form. For example, the two communication apparatuses are both implemented in a device form. Alternatively, the two communication apparatuses may be implemented in different forms. For example, the first communication apparatus is implemented in a device form, and the second communication apparatus is implemented in a chip form. The network device is, for example, a base station.

For ease of description, in the following descriptions, an example in which the method is performed by terminal apparatuses is used. In other words, an example in which the first communication apparatus is a terminal apparatus (for example, referred to as a first terminal apparatus) and the second communication apparatus is also a terminal apparatus (for example, referred to as a second terminal apparatus) is used. Because this embodiment uses an example in which the method is applied to the network architecture shown in FIG. 2, the first terminal apparatus described below may implement a function of the terminal device 1 in the network architecture shown in FIG. 2, and the second terminal apparatus described below may implement a function of the terminal device 2 in the network architecture shown in FIG. 2.

S31: The first terminal apparatus sends K2 first reference signals to the second terminal apparatus in K1 directions, and the second terminal apparatus receives the K2 first reference signals sent by the first terminal apparatus in the K1 directions, in other words, the second terminal apparatus receives the K2 first reference signals in the K1 directions corresponding to the first terminal apparatus. The K1 directions corresponding to the first terminal apparatus are K1 sending directions of the first terminal apparatus. Therefore, the K2 first reference signals are sent by the first terminal apparatus to the second terminal apparatus, and are sent in the K1 directions.

The K1 directions are all sending directions of the first terminal apparatus. Therefore, the K1 directions may also be referred to as K1 sending directions. K1 is a positive integer, and K2 may be an integer greater than or equal to K1. In other words, one or more first reference signals may be sent in one of the K1 directions. The K1 directions may correspond to K1 beams, in other words, correspond to K1 transmit beams. One first reference signal in the K2 first reference signals may be used to detect whether a beam in a corresponding direction fails. For a first reference signal, "a corresponding direction" may be a direction in which the first reference signal is located, a sending direction of the first reference signal, or a direction to which a beam in which the first reference signal is located points. The first reference signal is, for example, a CSI-RS or an SSB. "A beam in a corresponding direction" is a beam used to send the first reference signal. For example, if a first reference signal 1 in the K2 first reference signals is sent in a direction 1 in the K1 directions, a beam in a corresponding direction of the first reference signal 1 is a beam in the direction 1.

The K1 beams may be serving beams of the first terminal apparatus. For example, each of the K1 beams may be used to send a data signal to the second terminal apparatus. For example, the K1 beams are all of serving beams of the first terminal apparatus, or are a part of the serving beams of the first terminal apparatus. In this case, each of the K1 directions may be a direction in which the first terminal apparatus sends the data signal to the second terminal apparatus.

S32: The first terminal apparatus determines that beams in the K1 directions all fail for N1 consecutive times, where N1 is a positive integer.

For example, N1 may be configured by a network device, may be configured by the first terminal apparatus, may be configured by the second terminal apparatus, or may be specified in a protocol.

For example, that the beams in the K1 directions all fail may mean that beam-failure instances occur on all the beams in the K1 directions. For the case in which the beams in the K1 directions all fail in the following descriptions, the corresponding definition may also be followed.

For example, the beam-failure instance herein may mean that a hypothetical PSCCH BLER corresponding to an RSRP of a reference signal that is quasi co-located with a PSCCH is greater than a given threshold or that the RSRP of the reference signal that is quasi co-located with the PSCCH is less than a given threshold.

That beams in the K1 directions all fail for N1 consecutive times may be considered as content included in a BFD condition, in other words, considered as a BFD condition. The BFD condition may include only this condition, or may further include another condition.

In a manner in which the first terminal apparatus determines that the beams in the K1 directions all fail for the N1 consecutive times, the second terminal apparatus may measure the K2 first reference signals after receiving the K2 first reference signals, and determine, based on measurement results, whether the K1 beams fail. For example, the measurement result is an RSRP. If a hypothetical PSCCH BLER corresponding to an RSRP of a first reference signal transmitted in a beam is greater than a first threshold, the second terminal apparatus considers that the beam fails. The first threshold is, for example, equal to the threshold in the BFD condition in step ① described above. Alternatively, the first threshold may be configured by the network device, may be configured by the first terminal apparatus, may be configured by the second terminal apparatus, or may be specified in the protocol. If the second terminal apparatus determines that the beams in the K1 directions all fail for the N1 consecutive times, the second terminal apparatus may send a BFRR to the first terminal apparatus, and the first terminal apparatus may receive the BFRR from the second terminal apparatus. The BFRR may indicate that the beams in the K1 directions all fail for the N1 consecutive times. Provided that the first terminal apparatus receives the BFRR, the first terminal apparatus may determine that the beams in the K1 directions all fail for the N1 consecutive times.

If the first terminal apparatus and the second terminal apparatus are located within coverage of a same network device, the second terminal apparatus may send the BFRR to the network device. After receiving the BFRR, the network device may forward the BFRR to the first terminal apparatus. For example, the second terminal apparatus may send the BFRR to the network device via a physical uplink control channel (PUCCH) or a physical uplink shared channel (PUSCH). Alternatively, even if the first terminal apparatus and the second terminal apparatus are located within coverage of a same network device, the second terminal apparatus may directly send the BFRR to the first terminal apparatus without forwarding the BFRR by the network device. In this way, a delay can be reduced. If the first terminal apparatus and the second terminal apparatus are located within coverage of different network devices, the second terminal apparatus may directly send the BFRR to the first terminal apparatus, or the second terminal apparatus may send the BFRR to a network device serving the second terminal apparatus, the network device serving the second terminal apparatus forwards the BFRR to a network device serving the first terminal apparatus, and then the network device serving the first terminal apparatus forwards the BFRR to the first terminal apparatus.

If the first terminal apparatus receives the BFRR, the first terminal apparatus may send a second response message to the second terminal apparatus, where the second response message may be a response message for the BFRR. If the first terminal apparatus and the second terminal apparatus are located within the coverage of the same network device, the first terminal apparatus may send the second response message to the network device. After receiving the second response message, the network device may forward the second response message to the second terminal apparatus. For example, the first terminal apparatus may send the second response message to the network device via the PUCCH or the PUSCH. Alternatively, even if the first terminal apparatus and the second terminal apparatus are located within the coverage of the same network device, the first terminal apparatus may directly send the second response message to the second terminal apparatus without forwarding the second response message by the network device. In this way, a delay can be reduced. If the first terminal apparatus and the second terminal apparatus are located within the coverage of the different network devices, the first terminal apparatus may directly send the second response message to the second terminal apparatus, or the first terminal apparatus may send the second response message to the network device serving the first terminal apparatus, the network device serving the first terminal apparatus forwards the second response message to the network device serving the second terminal apparatus, and then the network device serving the second terminal apparatus forwards the second response message to the second terminal apparatus.

After sending the BFRR, the second terminal apparatus may maintain a first time window, for example, represented as a time window W1. The second terminal apparatus may monitor the second response message within the time window W1. If the second terminal apparatus does not obtain the second response message through monitoring within the time window W1, the second terminal apparatus may send the BFRR to the first terminal apparatus again, and monitor the second response message again. The rest may be deduced by analogy. A total quantity of times the second terminal apparatus sends the BFRR may be configured by the second terminal apparatus, configured by the network device, configured by the first terminal apparatus, or specified in the protocol. For example, the total quantity of times the second terminal apparatus sends the BFRR may be a positive integer. If a quantity of times the second terminal apparatus sends the BFRR has reached the total quantity, but the second terminal apparatus still does not receive the second response message, the second terminal apparatus may notify a higher layer of the second terminal apparatus, and the higher layer of the second terminal apparatus may perform beam recovery.

For example, the K1 beams are high-frequency beams, namely, beams in FR2. If the second terminal apparatus sends the BFRR to the first terminal apparatus, the BFRR may be sent through a link of FR2, or may be sent through a link of frequency range 1 (FR1). For example, the BFRR may be sent through the PSCCH or a physical sidelink shared channel (PSSCH). If the BFRR is sent through the PSSCH, one manner may be that the BFRR is carried in a MAC control element (CE). Because the K1 beams have failed, the BFRR is sent through the link of FR1, so that a sending success rate of the BFRR can be improved. The first terminal apparatus may send the second response message to the second terminal apparatus through the link of FR2, or the first terminal apparatus may send the second response message to the second terminal apparatus through the link of FR1, for example, send the second response message through the PSCCH or the PSSCH.

Alternatively, in another manner in which the first terminal apparatus determines that the beams in the K1 directions all fail for the N1 consecutive times, after receiving the K2 first reference signals, the second terminal apparatus may measure the K2 first reference signals, to obtain measurement results. The second terminal apparatus may send a first message to the first terminal apparatus, where the first message may indicate the results of measuring the K2 first reference signals by the second terminal apparatus. The first terminal apparatus may obtain the measurement results of the K2 first reference signals by receiving the first message from the second terminal apparatus. For example, the measurement result is an RSRP. If a hypothetical PSCCH BLER corresponding to an RSRP of a first reference signal transmitted in a beam is greater than a given threshold, the first terminal apparatus considers that the beam fails. In this way, the first terminal apparatus may determine whether the beams in the K1 directions all fail for the N1 consecutive times. Alternatively, the measurement result may be reference signal received quality (RSRQ) or the like. This is not limited. Alternatively, the first message sent by the second terminal apparatus to the first terminal apparatus may not include the measurement results of the K2 first reference signals, but include first indication information. The first indication information may indicate an available beam in the K1 beams, or indicate that none of the K1 beams is available. After receiving the first message from the second terminal apparatus, the first terminal apparatus may determine the available beam in the K1 beams, or determine that none of the K1 beams is available.

In this manner, the first terminal apparatus and the second terminal apparatus do not need to exchange BFRRs and second response messages, so that a step in a beam detection process is reduced, and beam recovery efficiency is further improved.

After S32 is performed, S33 and S34 may be performed. Alternatively, in an optional manner, before S33 is performed, S35 and S36 may be further performed. In addition, S31 and S35 may be performed simultaneously, or S31 may be performed before S35.

S33: The first terminal apparatus sends P2 second reference signals to the second terminal apparatus in P1 directions, and the second terminal apparatus receives the P2 second reference signals sent by the first terminal apparatus in the P1 directions, in other words, the second terminal apparatus receives the P2 second reference signals in the P1 directions corresponding to the first terminal apparatus. The P1 directions corresponding to the first terminal apparatus are P1 sending directions of the first terminal apparatus. Therefore, the P2 second reference signals are sent by the first terminal apparatus to the second terminal apparatus, and are sent in the P1 directions.

The P1 directions are all sending directions of the first terminal apparatus. Therefore, the P1 directions may also be referred to as P1 sending directions. Both P1 and P2 are positive integers, and P2 may be greater than or equal to P1. In other words, one or more first reference signals may be sent in one of the P1 directions. The P1 directions may correspond to P1 beams, in other words, correspond to P1 transmit beams. One second reference signal in the P2 second reference signals may be used to measure quality of a beam in a corresponding direction. For a second reference signal, "a corresponding direction" may be a direction in which the second reference signal is located, a sending direction of the second reference signal, or a direction to which a beam in which the second reference signal is located points. The second reference signal is, for example, a CSI-RS or an SSB. "A beam in a corresponding direction" is a beam used to send the second reference signal. For example, if a second reference signal 1 in the P2 second reference signals is sent in a direction 2 in the P1 directions, a beam in a corresponding direction of the second reference signal 1 is a beam in the direction 2.

The P1 directions may be a part of all sending directions supported by the first terminal apparatus. In this case, the P1 directions may include the K1 directions, or may not include the K1 directions. For example, the first terminal apparatus supports 64 sending directions in total, and P1=32. That is, the P1 directions are 32 of the 64 directions. In addition, K1=1, and the P1 directions include the K1 directions. That is, the K1 directions are only one of the P1 directions. For another example, the first terminal apparatus supports 64 sending directions in total, and P1=32. That is, the P1 directions are 32 of the 64 directions. In addition, K1=1, and the P1 directions do not include the K1 directions. That is, the P1 directions are 32 directions other than the K1 directions in the 64 directions. Alternatively, the P1 directions may be all sending directions supported by the first terminal apparatus. In this case, the P1 directions include the K1 directions, and P1 is greater than or equal to K1. For example, the first terminal apparatus supports 64 sending directions in total, P1=64, and K1=1. That is, the K1 directions are only one of the 64 directions.

This is equivalent to that if the beams in the K1 directions fail, the first terminal apparatus may continue to determine whether there is an available beam in more directions (namely, the P1 directions). A possibility that there is an available beam in the P1 directions is greater than a possibility that there is an available beam in the K1 directions, so that a possibility of obtaining the available beam is improved. In this manner, the available beam is determined by using a physical layer as much as possible. In other words, beam recovery is performed by using the physical layer. In this way, a probability of performing beam recovery by using a higher layer is reduced. There is no node continuously sending reference signals on a sidelink. If the higher layer performs beam recovery, the higher layer may obtain, in a long time, no reference signal used for beam recovery. Consequently, the beam recovery efficiency is low, and even beam recovery may not be completed. It can be learned that according to the technical solution provided in this embodiment of this application, beam recovery is performed by using the physical layer as much as possible, so that the beam recovery efficiency is improved, and a service delay caused by a beam failure is also reduced.

S34: The second terminal apparatus sends measurement results of the P2 second reference signals to the first terminal apparatus, and the first terminal apparatus receives the measurement results that are of the P2 second reference signals and that are from the second terminal apparatus.

For example, after receiving the P2 second reference signals, the second terminal apparatus may measure the P2 second reference signals, to obtain the measurement results. The second terminal apparatus may send a first response message to the first terminal apparatus. The first response message includes the measurement results of the P2 second reference signals. The first terminal apparatus obtains the measurement results of the P2 second reference signals by receiving the first response message from the second terminal apparatus.

Alternatively, the first response message sent by the second terminal apparatus to the first terminal apparatus may not include the measurement results of the P2 second reference signals, but include second indication information. The second indication information may indicate an available beam in the P1 beams, or indicate that none of the P1 beams is available.

If the first terminal apparatus and the second terminal apparatus are located within coverage of a same network device, the second terminal apparatus may send the first response message to the network device. After receiving the first response message, the network device may forward the first response message to the first terminal apparatus. For example, the second terminal apparatus may send the first response message to the network device via the PUCCH or the PUSCH. Alternatively, even if the first terminal apparatus and the second terminal apparatus are located within coverage of a same network device, the second terminal apparatus may directly send the first response message to the first terminal apparatus without forwarding the first response message by the network device. In this way, a delay can be reduced. If the first terminal apparatus and the second terminal apparatus are located within coverage of different network devices, the second terminal apparatus may directly send the first response message to the first terminal apparatus, or the second terminal apparatus may send the first response message to a network device serving the second terminal apparatus, the network device serving the second terminal apparatus forwards the first response message to a network device serving the first terminal apparatus, and then the network device serving the first terminal apparatus forwards the first response message to the first terminal apparatus.

S35: The first terminal apparatus sends M2 third reference signals to the second terminal apparatus in M1 directions, and the second terminal apparatus receives the M2 third reference signals sent by the first terminal apparatus in the M1 directions, in other words, the second terminal apparatus receives the M2 third reference signals in the M1 directions corresponding to the first terminal apparatus. The M1 directions corresponding to the first terminal apparatus are M1 sending directions of the first terminal apparatus. Therefore, the M2 third reference signals are sent by the first terminal apparatus to the second terminal apparatus, and are sent in the M1 directions.

The M1 directions are all sending directions of the first terminal apparatus. Therefore, the M1 directions may also be referred to as M1 sending directions. M1 is a positive integer, and M2 may be an integer greater than or equal to M1. In other words, one or more third reference signals may be sent in one of the M1 directions. The M1 directions may correspond to M1 beams, in other words, correspond to M1 transmit beams. One third reference signal in the M2 third reference signals may be used to detect whether a beam in a direction in which the third reference signal is located is available. For example, that the beam in the direction in which the third reference signal is located is available may mean that the beam may be used to recover a connection between the first terminal apparatus and the second terminal apparatus. For a third reference signal, "a corresponding direction" may be a direction in which the third reference signal is located, a sending direction of the third reference signal, or a direction to which a beam in which the third reference signal is located points. "A beam in the corresponding direction" is a beam used to send the third reference signal. For example, if a third reference signal 1 in the M2 third reference signals is sent in a direction 3 in the M1 directions, a beam in a corresponding direction of the third reference signal 1 is a beam in the direction 3.

The M1 beams may be candidate beams of the first terminal apparatus. For example, the M1 beams are all of candidate beams of the first terminal apparatus, or are a part of the candidate beams of the first terminal apparatus.

If the P1 directions are all the sending directions supported by the first terminal apparatus, the P1 directions may include the M1 directions. In other words, the P1 directions may include the K1 directions and the M1 directions. The P1 directions may further include another direction in addition to the K1 directions and the M1 directions. For example, P1=64, and the first terminal apparatus supports 64 sending directions in total. In other words, the first terminal apparatus supports 64 beams in total. K1=1, and the first terminal apparatus has one serving beam. M1=3, and the first terminal apparatus has three candidate beams. Therefore, the 64 beams further include 60 remaining beams in addition to the serving beam and the three candidate beams. Alternatively, the P1 directions may include only the K1 directions and the M1 directions, and include no other direction. Alternatively, the P1 directions are the part of all the sending directions supported by the first terminal apparatus. In this case, the P1 directions may include the M1 directions, or may not include the M1 directions.

S36: The first terminal apparatus determines that for N2 consecutive times, none of beams in the M1 directions can be used to recover a communication connection, where N2 is a positive integer. "Recovering a communication connection" means recovering a communication connection between the first terminal apparatus and the second terminal apparatus.

For example, N2 may be configured by the network device, may be configured by the first terminal apparatus, may be configured by the second terminal apparatus, or may be specified in the protocol.

That for N2 consecutive times, none of beams in the M1 directions can be used to recover a communication connection may be considered as content included in the BFD condition, in other words, considered as a BFD condition. For example, the BFD condition may include that the beams in the K1 directions all fail for the N1 consecutive times and that for the N2 consecutive times, none of the beams in the M1 directions can be used to recover the communication connection. Alternatively, the BFD condition may further include another condition.

In a manner in which the first terminal apparatus determines that for the N2 consecutive times, none of the beams in the M1 directions can be used to recover the communication connection, after receiving M2 second reference signals, the second terminal apparatus may measure the M2 second reference signals, and determine, based on measurement results, whether the M1 beams can be used to recover the communication connection. For example, the measurement result is an RSRP. If an RSRP of a third reference signal transmitted in a beam is greater than a second threshold, the second terminal apparatus considers that the beam can be used to recover the communication connection. Otherwise, the second terminal apparatus considers that the beam cannot be used to recover the communication connection. The second threshold is, for example, equal to the threshold in step ② described above. Alternatively, the second threshold may be configured by the network device, may be configured by the first terminal apparatus, may be configured by the second terminal apparatus, or may be specified in the protocol. If the second terminal apparatus determines that the beams in the K1 directions all fail for the N1 consecutive times and that for the N2 consecutive times, none of the beams in the M1 directions can be used to recover the communication connection, the second terminal apparatus may send the BFRR to the first terminal apparatus, and the first terminal apparatus may receive the BFRR from the second terminal apparatus. In this case, the BFRR may indicate that the beams in the K1 directions all fail for the N1 consecutive times and indicate that for the N2 consecutive times, none of the beams in the M1 directions can be used to recover the communication connection. Provided that the first terminal apparatus receives the BFRR, the first terminal apparatus may determine that the beams in the K1 directions all fail for the N1 consecutive times and determine that for the N2 consecutive times, none of the beams in the M1 directions can be used to recover the communication connection. For content such as a manner in which the first terminal apparatus sends the BFRR to the second terminal apparatus, refer to the related descriptions in S32.

If the first terminal apparatus receives the BFRR, the first terminal apparatus may send the second response message to the second terminal apparatus, where the second response message may be the response message for the BFRR. For content such as a manner in which the first terminal apparatus sends the second response message to the second terminal apparatus, refer to the related descriptions in S32.

Alternatively, in another manner in which the first terminal apparatus determines that for the N2 consecutive times, none of the beams in the M1 directions can be used to recover the communication connection, after receiving M2 second reference signals, the second terminal apparatus may measure the M2 second reference signals, to obtain measurement results. The second terminal apparatus may send a fourth message to the first terminal apparatus, where the fourth message may indicate results of measuring the M2 second reference signals by the second terminal apparatus. The second terminal apparatus may send the measurement results to the first terminal apparatus by using the fourth message, and the first terminal apparatus may receive the fourth message from the second terminal apparatus. For example, the measurement result is an RSRP. If an RSRP of a second reference signal transmitted in a beam is less than a second threshold, the first terminal apparatus considers that the beam cannot be used to recover the communication connection. In this way, the first terminal apparatus may determine whether for the N2 consecutive times, none of the beams in the M1 directions can be used to recover the communication connection. Alternatively, the measurement result may be RSRQ or the like. This is not limited.

If S33 and S34 are directly performed after S32 is performed, that is, S35 and S36 are not performed, it is equivalent to that the first terminal apparatus may send the P2 second reference signals to the second terminal apparatus after determining that the beams in the K1 directions all fail for the N1 consecutive times. Alternatively, if S35 and S36 further need to be performed after S32 is performed, and then S33 and S34 are performed, it is equivalent to that the first terminal apparatus sends the P2 second reference signals to the second terminal apparatus after determining that the beams in the K1 directions all fail for the N1 consecutive times and determining that for the N2 consecutive times, none of the beams in the M1 directions can be used to recover the communication connection.

S37: The first terminal apparatus determines, based on the measurement results of the P2 second reference signals, whether the P1 beams corresponding to the P1 directions are available.

For example, if the second terminal apparatus receives, through steps in S34, the measurement results that are of the P2 second reference signals and that are from the second terminal device, the first terminal apparatus may determine, based on the measurement results of the P2 second reference signals, whether the P1 beams corresponding to the P1 directions are available. For example, the measurement result is an RSRP. If the first terminal apparatus determines that an RSRP is greater than a third threshold, the first terminal apparatus determines that a beam corresponding to a second reference signal corresponding to the RSRP is an available beam. If the first terminal apparatus determines that an RSRP is less than or equal to a third threshold, the first terminal apparatus determines that a beam corresponding to a second reference signal corresponding to the RSRP is an unavailable beam. The third threshold may be configured by the network device, may be configured by the first terminal apparatus, may be configured by the second terminal apparatus, or may be specified in the protocol. Alternatively, the measurement result of the second reference signal may be RSRQ or the like. This is not specifically limited.

Alternatively, the second terminal apparatus may send indication information to the first terminal apparatus in S34. The indication information may indicate the available beam in the P1 beams, or indicate that none of the P1 beams is available. In this case, after receiving the indication information, the first terminal apparatus may determine whether the P1 beams are available, and does not need to perform determining based on the measurement results, so that implementation of the first terminal apparatus is simplified.

After determining whether the P1 beams are available, the first terminal apparatus may send a second message to the second terminal apparatus. The second message is used to indicate the available beam in the P1 beams or indicate that none of the P1 beams is available. After the second terminal apparatus receives the second message, if the second message indicates the available beam in the P1 beams, the second terminal apparatus may determine, based on the second message, which beam in the P1 beams is available; or if the second message indicates that none of the P1 beams is available, the second terminal apparatus may determine, based on the second message, that none of the P1 beams is available. If the second message indicates the available beam in the P1 beams, a manner is that the second message includes an identifier of the available beam in the P1 beams, where the identifier of the beam is, for example, an ID of the beam or a number of the beam. The second terminal apparatus may determine, based on the identifier that is of the beam and that is included in the second message, that the beam corresponding to the identifier is the available beam.

Alternatively, in another optional implementation, after the first terminal apparatus determines whether the P1 beams are available, if there is an available beam in the P1 beams, the first terminal apparatus may send a second message to the second terminal apparatus, where the second message is used to indicate the available beam in the P1 beams. After receiving the second message, the second terminal apparatus may determine, based on the second message, which beam in the P1 beams is available. However, if there is no available beam in the P1 beams, the first terminal apparatus may skip sending the second message to the second terminal apparatus. If the second terminal apparatus does not receive the second message from the first terminal apparatus, the second terminal apparatus may determine that none of the P1 beams is available.

If the first terminal apparatus and the second terminal apparatus are located within the coverage of the same network device, the first terminal apparatus may send the second message to the network device. After receiving the second message, the network device may forward the second message to the second terminal apparatus. For example, the first terminal apparatus may send the second message to the network device via the PUCCH or the PUSCH. Alternatively, even if the first terminal apparatus and the second terminal apparatus are located within the coverage of the same network device, the first terminal apparatus may directly send the second message to the second terminal apparatus without forwarding the second message by the network device. In this way, a delay can be reduced. If the first terminal apparatus and the second terminal apparatus are located within the coverage of the different network devices, the first terminal apparatus may directly send the second message to the second terminal apparatus, or the first terminal apparatus may send the second message to the network device serving the first terminal apparatus, the network device serving the first terminal apparatus forwards the second message to the network device serving the second terminal apparatus, and then the network device serving the second terminal apparatus forwards the second message to the second terminal apparatus.

Alternatively, if the first terminal apparatus determines that none of the P1 beams is available, the first terminal apparatus may skip sending a message to the second terminal apparatus, that is, skip sending the second message. If the second terminal apparatus does not receive the second message from the first terminal apparatus, the second terminal apparatus may determine that none of the P1 beams is available.

If the first terminal apparatus determines that there is an available beam in the P1 beams, the first terminal apparatus may select a part or all of available beams as a serving beam of the first terminal apparatus. This is equivalent to completing beam recovery. This is also the same for the second terminal apparatus. If the second terminal apparatus determines that there is an available beam in the P1 beams, the second terminal apparatus may determine the part or all of the available beams as the serving beam of the first terminal apparatus. This is equivalent to completing beam recovery. For example, which available beam is selected as a new serving beam may be selected by the first terminal apparatus. After selecting the available beam, the first terminal apparatus may send a third message to the second terminal apparatus. The third message is used to indicate the new serving beam. For example, the third message may include an identifier of the new serving beam. After receiving the third message, the second terminal apparatus may determine which beam is used as the new serving beam of the first terminal apparatus.

However, if the first terminal apparatus determines that none of the P1 beams is available, the first terminal apparatus may notify a higher layer of the first terminal apparatus, and the higher layer of the first terminal apparatus may perform beam recovery. Likewise, if the second terminal apparatus determines that none of the P1 beams is available, the second terminal apparatus may notify the higher layer of the second terminal apparatus, and the higher layer of the second terminal apparatus may perform beam recovery. Specifically, the higher layer of the second terminal apparatus may cooperate with the higher layer of the first terminal apparatus to perform beam recovery. Specifically, the higher layer of the first terminal apparatus may cooperate with the higher layer of the second terminal apparatus to perform beam recovery. For example, the higher layer of the first terminal apparatus and the higher layer of the second terminal apparatus may perform beam recovery through radio link monitoring (RLM) or in another manner. A higher layer of a terminal apparatus includes, for example, one or more of the following layers: an RRC layer, a media access control (MAC) layer, a radio link control (RLC) layer, or a packet data convergence protocol (PDCP) layer. For example, the higher layer of the terminal apparatus includes the RRC layer; the higher layer of the terminal apparatus includes the RLC layer and the PDCP layer; the higher layer of the terminal apparatus includes the MAC layer; or the higher layer of the terminal apparatus includes the MAC layer, the RLC layer, the PDCP layer, and the RRC layer.

In this embodiment of this application, the first terminal apparatus may send the first reference signals to the second terminal apparatus, so that the first terminal apparatus can determine whether the beams in the K1 directions fail. This is equivalent to providing a beam failure detection mechanism in SL communication. In addition, if the first terminal apparatus determines that the beams in the K1 directions fail, the first terminal apparatus may further send the P2 second reference signals to the second terminal apparatus in the P1 directions. It may be understood that the K1 directions are directions corresponding to the serving beams of the first terminal apparatus, and the P1 directions are the part or all of the sending directions supported by the first terminal apparatus. A quantity of directions included in the P1 directions may be greater than a quantity of directions included in the K1 directions. In other words, if the beams in the K1 directions fail, the first terminal apparatus may continue to determine whether there is an available beam in more directions (namely, the P1 directions). The possibility that there is an available beam in the P1 directions is greater than the possibility that there is an available beam in the K1 directions, so that the possibility of obtaining the available beam is improved. In this manner, the available beam is determined by using the physical layer as much as possible. In other words, beam recovery is performed by using the physical layer. Beam recovery does not need to be performed by using the higher layer, so that beam recovery efficiency is improved, and the service delay caused by the beam failure is also reduced.

Figure 4:
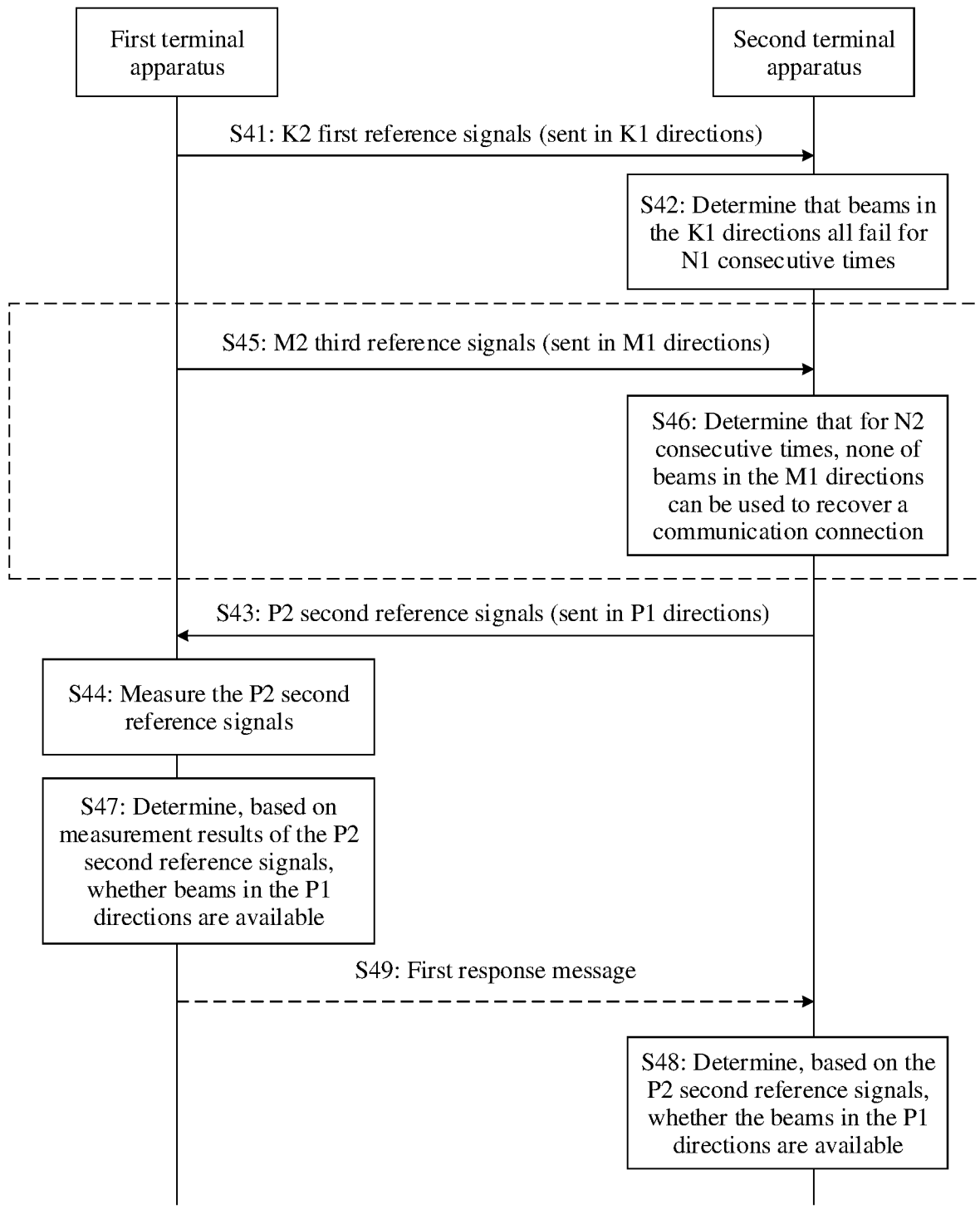
FIG. 4 is a flowchart of a second communication method according to an embodiment of this application.

An embodiment of this application provides a second communication method, to resolve a same technical problem. FIG. 4 is a flowchart of the method. In the following description process, an example in which the method is applied to the network architecture shown in FIG. 2 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device in implementing a function required by the method, may be a terminal device or a communication apparatus that can support the terminal device in implementing a function required by the method, or certainly may be another communication apparatus, for example, a chip. In addition, an implementation of the first communication apparatus or the second communication apparatus is not limited. For example, the two communication apparatuses may be implemented in a same form. For example, the two communication apparatuses are both implemented in a device form. Alternatively, the two communication apparatuses may be implemented in different forms. For example, the first communication apparatus is implemented in a device form, and the second communication apparatus is implemented in a chip form. The network device is, for example, a base station.

For ease of description, in the following descriptions, an example in which the method is performed by terminal apparatuses is used. In other words, an example in which the first communication apparatus is a terminal apparatus (for example, referred to as a first terminal apparatus) and the second communication apparatus is also a terminal apparatus (for example, referred to as a second terminal apparatus) is used. Because this embodiment uses an example in which the method is applied to the network architecture shown in FIG. 2, the first terminal apparatus described below may implement a function of the terminal device 1 in the network architecture shown in FIG. 2, and the second terminal apparatus described below may implement a function of the terminal device 2 in the network architecture shown in FIG. 2.

S41: The first terminal apparatus sends K2 first reference signals to the second terminal apparatus in K1 sending directions, and the second terminal apparatus receives the K2 first reference signals sent by the first terminal apparatus in the K1 sending directions, in other words, the second terminal apparatus receives K2 first reference signals in K1 directions corresponding to the first terminal apparatus. The K1 directions corresponding to the first terminal apparatus are K1 sending directions of the first terminal apparatus. Therefore, the K2 first reference signals are sent by the first terminal apparatus to the second terminal apparatus, and are sent in the K1 directions.

For more content of S41, refer to the descriptions of S31 in the embodiment shown in FIG. 3.

S42: The second terminal apparatus determines that beams in the K1 sending directions all fail for N1 consecutive times, where N1 is a positive integer.

For example, N1 may be configured by a network device, may be configured by the first terminal apparatus, may be configured by the second terminal apparatus, or may be specified in a protocol.

That beams in the K1 sending directions all fail for N1 consecutive times may be considered as content included in a BFD condition, in other words, considered as a BFD condition. The BFD condition may include only this condition, or may further include another condition.

For example, after receiving the K2 first reference signals, the second terminal apparatus may measure the K2 first reference signals, and determine, based on measurement results, whether K1 beams fail. For example, the measurement result is an RSRP. If a hypothetical PSCCH BLER corresponding to an RSRP of a first reference signal transmitted in a beam is greater than a first threshold, the second terminal apparatus considers that the beam fails. The first threshold is, for example, equal to the threshold in the BFD condition in step ① described above. Alternatively, the first threshold may be configured by the network device, may be configured by the first terminal apparatus, may be configured by the second terminal apparatus, or may be specified in the protocol.

After S42 is performed, S43 and S44 may be performed. Alternatively, in an optional manner, before S43 is performed, S45 and S46 may be further performed.

S43: The second terminal apparatus sends P2 second reference signals to the first terminal apparatus, and the first terminal apparatus receives the P2 second reference signals from the second terminal apparatus in P3 receiving directions. The P3 receiving directions correspond to P1 sending directions of the first terminal apparatus. Therefore, it may be considered that the P2 second reference signals correspond to the P1 sending directions of the first terminal apparatus. P1 is a positive integer, and P2 is an integer greater than or equal to P3.

Each of the P3 receiving directions is a receiving direction of the first terminal apparatus, and each of the P1 sending directions is a sending direction of the first terminal apparatus. The P3 receiving directions may correspond to P3 receive beams, and the P1 sending directions may correspond to P1 sending beams. For example, P1 may be equal to P3, or certainly, P1 may not be equal to P3. The first terminal apparatus may support one or more beam correspondences. Each beam correspondence includes one transmit beam and one receive beam, and the transmit beam and the receive beam that are indicated by the beam correspondence are in a one-to-one correspondence. If P1=P3, the P1 transmit beams and the P3 receive beams may be considered as P1 beam correspondences. In this case, the first terminal apparatus may be considered to have a beam correspondence (beam correspondence) property. In this case, the first terminal apparatus receives the P2 second reference signals by using the P3 receive beams, and the P3 receive beams correspond to the P1 transmit beams. Therefore, it may be considered that the P2 second reference signals correspond to the P1 transmit beams. One second reference signal in the P2 second reference signals may be used to measure quality of a beam in a receiving direction that is of the first terminal apparatus and in which the second reference signal is located. The quality of the beam in the receiving direction of the first terminal apparatus corresponds to quality of a beam in a sending direction of the first terminal apparatus.

For more content of S43, for example, explanations of the P1 sending directions, refer to the related descriptions of S33 in the embodiment shown in FIG. 3.

S44: The first terminal apparatus measures the P2 second reference signals.

For example, after receiving the P2 second reference signals, the first terminal apparatus may measure the P2 second reference signals, to obtain measurement results. The measurement result is, for example, an RSRP, or may be RSRQ or the like. This is not specifically limited.

S45: The first terminal apparatus sends M2 third reference signals to the second terminal apparatus in M1 sending directions, and the second terminal apparatus receives the M2 third reference signals sent by the first terminal apparatus in the M1 sending directions, in other words, the second terminal apparatus receives M2 third reference signals in M1 directions corresponding to the first terminal apparatus. The M1 directions corresponding to the first terminal apparatus are M1 sending directions of the first terminal apparatus. Therefore, the M2 third reference signals are sent by the first terminal apparatus to the second terminal apparatus, and are sent in the M1 directions.

For more content of S45, refer to the related descriptions of S35 in the embodiment shown in FIG. 3.

S46: The second terminal apparatus determines that for N2 consecutive times, none of beams in the M1 sending directions can be used to recover a communication connection, where N2 is a positive integer.

For example, N2 may be configured by the network device, may be configured by the first terminal apparatus, may be configured by the second terminal apparatus, or may be specified in the protocol.

That for the N2 consecutive times, none of the beams in the M1 directions can be used to recover the communication connection may be considered as content included in the BFD condition, in other words, considered as a BFD condition. For example, the BFD condition may include that the beams in the K1 directions all fail for the N1 consecutive times and that for the N2 consecutive times, none of the beams in the M1 directions can be used to recover the communication connection. Alternatively, the BFD condition may further include another condition.

For example, after receiving M2 second reference signals, the second terminal apparatus may measure the M2 second reference signals, to obtain measurement results. For example, the measurement result is an RSRP. If an RSRP of a second reference signal transmitted in a beam is less than a second threshold, the second terminal apparatus considers that the beam cannot be used to recover the communication connection. Therefore, the second terminal apparatus may determine whether for the N2 consecutive times, none of the beams in the M1 sending directions can be used to recover the communication connection. Alternatively, the measurement result may be RSRQ or the like. This is not limited.

If S43 and S44 are directly performed after S42 is performed, that is, S45 and S46 are not performed, it is equivalent to that the second terminal apparatus may send the P2 second reference signals to the first terminal apparatus after determining that the beams in the K1 directions all fail for the N1 consecutive times. Alternatively, if S45 and S46 further need to be performed after S42 is performed, and then S43 and S44 are performed, it is equivalent to that the second terminal apparatus may send the P2 second reference signals to the first terminal apparatus after determining that the beams in the K1 directions all fail for the N1 consecutive times and determining that for the N2 consecutive times, none of the beams in the M1 directions can be used to recover the communication connection.

S47: The first terminal apparatus determines, based on the measurement results of the P2 second reference signals, whether P1 beams corresponding to the P1 sending directions are available.

The first terminal apparatus may determine, based on the measurement results that are of the P2 second reference signals and that are obtained in S44, whether the P1 beams corresponding to the P1 directions are available. For example, the measurement result is an RSRP. If the first terminal apparatus determines that an RSRP is greater than a third threshold, the first terminal apparatus determines that a beam corresponding to a second reference signal corresponding to the RSRP is an available beam. If the first terminal apparatus determines that an RSRP is less than or equal to a third threshold, the first terminal apparatus determines that a beam corresponding to a second reference signal corresponding to the RSRP is an unavailable beam. The third threshold may be configured by the network device, may be configured by the first terminal apparatus, may be configured by the second terminal apparatus, or may be specified in the protocol. Alternatively, the measurement result of the second reference signal may be RSRQ or the like. This is not specifically limited.

S48: The second terminal apparatus determines, based on the P2 second reference signals, whether the P1 beams corresponding to the P1 sending directions are available.

In an optional implementation, after the first terminal apparatus determines whether the P1 beams are available, the first terminal apparatus may send a first response message to the second terminal apparatus. Refer to S49. The first response message is used to indicate an available beam in the P1 beams or indicate that none of the P1 beams is available. After the second terminal apparatus receives the first response message, if the first response message indicates the available beam in the P1 beams, the second terminal apparatus may determine, based on the first response message, which beam in the P1 beams is available; or if the first response message indicates that none of the P1 beams is available, the second terminal apparatus may determine, based on the first response message, that none of the P1 beams is available. If the first response message indicates the available beam in the P1 beams, a manner is that the first response message includes an identifier of the available beam in the P1 beams, where the identifier of the beam is, for example, an ID of the beam or a number of the beam. The second terminal apparatus may determine, based on the identifier that is of the beam and that is included in the first response message, that the beam corresponding to the identifier is the available beam.

Alternatively, in another optional implementation, after the first terminal apparatus determines whether the P1 beams are available, if there is an available beam in the P1 beams, the first terminal apparatus may send a first response message to the second terminal apparatus, where the first response message is used to indicate the available beam in the P1 beams. After receiving the first response message, the second terminal apparatus may determine, based on the first response message, which beam in the P1 beams is available. However, if there is no available beam in the P1 beams, the first terminal apparatus may skip sending the first response message to the second terminal apparatus. If the second terminal apparatus does not receive the first response message from the first terminal apparatus, the second terminal apparatus may determine that none of the P1 beams is available.

If the first terminal apparatus and the second terminal apparatus are located within coverage of a same network device, the first terminal apparatus may send the first response message to the network device. After receiving the first response message, the network device may forward the first response message to the second terminal apparatus. For example, the first terminal apparatus may send the first response message to the network device via a PUCCH or a PUSCH. Alternatively, even if the first terminal apparatus and the second terminal apparatus are located within coverage of a same network device, the first terminal apparatus may directly send the first response message to the second terminal apparatus without forwarding the first response message by the network device. In this way, a delay can be reduced. If the first terminal apparatus and the second terminal apparatus are located within coverage of different network devices, the first terminal apparatus may directly send the first response message to the second terminal apparatus, or the first terminal apparatus may send the first response message to a network device serving the first terminal apparatus, the network device serving the first terminal apparatus forwards the first response message to a network device serving the second terminal apparatus, and then the network device serving the second terminal apparatus forwards the first response message to the second terminal apparatus.

If the first terminal apparatus determines, in S47, that there is an available beam in the P1 beams, the first terminal apparatus may select a part or all of available beams as a serving beam of the first terminal apparatus. This is equivalent to completing beam recovery. This is also the same for the second terminal apparatus. If the second terminal apparatus determines, in S48, that there is an available beam in the P1 beams, the second terminal apparatus may determine the part or all of the available beams as the serving beam of the first terminal apparatus. This is equivalent to completing beam recovery. For example, which available beam is selected as a new serving beam may be selected by the first terminal apparatus. After selecting the available beam, the first terminal apparatus may send a third message to the second terminal apparatus. The third message is used to indicate the new serving beam. For example, the third message may include an identifier of the new serving beam. After receiving the third message, the second terminal apparatus may determine which beam is used as the new serving beam of the first terminal apparatus.

If the first terminal apparatus and the second terminal apparatus are located within the coverage of the same network device, the first terminal apparatus may send the third message to the network device. After receiving the third message, the network device may forward the third message to the second terminal apparatus. For example, the first terminal apparatus may send the third message to the network device via the PUCCH or the PUSCH. Alternatively, even if the first terminal apparatus and the second terminal apparatus are located within the coverage of the same network device, the first terminal apparatus may directly send the third message to the second terminal apparatus without forwarding the third message by the network device. In this way, a delay can be reduced. If the first terminal apparatus and the second terminal apparatus are located within the coverage of the different network devices, the first terminal apparatus may directly send the third message to the second terminal apparatus, or the first terminal apparatus may send the third message to the network device serving the first terminal apparatus, the network device serving the first terminal apparatus forwards the third message to the network device serving the second terminal apparatus, and then the network device serving the second terminal apparatus forwards the third message to the second terminal apparatus.

However, if the first terminal apparatus determines, in S47, that none of the P1 beams is available, the first terminal apparatus may notify a higher layer of the first terminal apparatus, and the higher layer of the first terminal apparatus may perform beam recovery. Likewise, if the second terminal apparatus determines, in S48, that none of the P1 beams is available, the second terminal apparatus may notify a higher layer of the second terminal apparatus, and the higher layer of the second terminal apparatus may perform beam recovery. Specifically, the higher layer of the second terminal apparatus may cooperate with the higher layer of the first terminal apparatus to perform beam recovery. Specifically, the higher layer of the first terminal apparatus may cooperate with the higher layer of the second terminal apparatus to perform beam recovery. For example, the higher layer of the first terminal apparatus and the higher layer of the second terminal apparatus may perform beam recovery through RLM or in another manner. A higher layer of a terminal apparatus includes, for example, one or more the following layers: an RRC layer, a MAC layer, an RLC layer, or a PDCP layer. For example, the higher layer of the terminal apparatus includes the RRC layer; the higher layer of the terminal apparatus includes the RLC layer and the PDCP layer; the higher layer of the terminal apparatus includes the MAC layer; or the higher layer of the terminal apparatus includes the MAC layer, the RLC layer, the PDCP layer, and the RRC layer.

In this embodiment of this application, the first terminal apparatus may send the first reference signals to the second terminal apparatus, so that the first terminal apparatus can determine whether the beams in the K1 sending directions fail. This is equivalent to providing a beam failure detection mechanism in SL communication. In addition, if the second terminal apparatus determines that the beams in the K1 sending directions fail, the second terminal apparatus may further send the P2 second reference signals to the first terminal apparatus, and the first terminal apparatus receives the P2 second reference signals from the second terminal apparatus in the P3 receiving directions. It may be understood as that the K1 sending directions are directions corresponding to serving beams of the first terminal apparatus, and the P3 receiving directions are a part or all of all receiving directions supported by the first terminal apparatus. The first terminal apparatus may support the one or more beam correspondences. Each beam correspondence includes the transmit beam and the receive beam, and the transmit beam and the receive beam that are indicated by the beam correspondence are in the one-to-one correspondence. Therefore, the P3 receive beams may correspond to the P1 transmit beams of the first terminal apparatus. Then, the P3 receiving directions correspond to the P1 sending directions of the first terminal apparatus. A quantity of directions included in the P1 sending directions may be greater than a quantity of directions included in the K1 sending directions. In other words, if the beams in the K1 sending directions fail, the first terminal apparatus may continue to determine whether there is an available beam in more directions (namely, the P1 sending directions). A possibility that there is an available beam in the P1 sending directions is greater than a possibility that there is an available beam in the K1 sending directions, so that a possibility of obtaining the available beam is improved. In this manner, the available beam is determined by using a physical layer as much as possible. In other words, beam recovery is performed by using the physical layer. Beam recovery does not need to be performed by using the higher layer, so that beam recovery efficiency is improved, and a service delay caused by a beam failure is also reduced.

In the embodiment shown in FIG. 3 or the embodiment shown in FIG. 4, the BFD condition may include a condition 1, or may include the condition 1 and a condition 2. The condition 1 is that the beams in the K1 directions all fail for the N1 consecutive times. The condition 2 is that for the N2 consecutive times, none of the beams in the M1 directions can be used to recover the communication connection. When the BFD condition includes the condition 1 and the condition 2, both the embodiment shown in FIG. 3 and the embodiment shown in FIG. 4 describe processing manners used when both the condition 1 and the condition 2 are satisfied. There is another possibility that only the condition 1 is satisfied but the condition 2 is not satisfied. Therefore, an embodiment of this application provides a third communication method, to describe a processing manner used when the condition 1 is satisfied but the condition 2 is not satisfied. FIG. 4 is a flowchart of the method.

In the following description process, an example in which the method is applied to the network architecture shown in FIG. 2 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device in implementing a function required by the method, may be a terminal device or a communication apparatus that can support the terminal device in implementing a function required by the method, or certainly may be another communication apparatus, for example, a chip. In addition, an implementation of the first communication apparatus or the second communication apparatus is not limited. For example, the two communication apparatuses may be implemented in a same form. For example, the two communication apparatuses are both implemented in a device form. Alternatively, the two communication apparatuses may be implemented in different forms. For example, the first communication apparatus is implemented in a device form, and the second communication apparatus is implemented in a chip form. The network device is, for example, a base station.

For ease of description, in the following descriptions, an example in which the method is performed by terminal apparatuses is used. In other words, an example in which the first communication apparatus is a terminal apparatus (for example, referred to as a first terminal apparatus) and the second communication apparatus is also a terminal apparatus (for example, referred to as a second terminal apparatus) is used. Because this embodiment uses an example in which the method is applied to the network architecture shown in FIG. 2, the first terminal apparatus described below may implement a function of the terminal device 1 in the network architecture shown in FIG. 2, and the second terminal apparatus described below may implement a function of the terminal device 2 in the network architecture shown in FIG. 2.

S501: The first terminal apparatus sends K2 first reference signals to the second terminal apparatus in K1 sending directions, and the second terminal apparatus receives the K2 first reference signals sent by the first terminal apparatus in the K1 sending directions, in other words, the second terminal apparatus receives K2 first reference signals in K1 directions corresponding to the first terminal apparatus. The K1 directions corresponding to the first terminal apparatus are K1 sending directions of the first terminal apparatus. Therefore, the K2 first reference signals are sent by the first terminal apparatus to the second terminal apparatus, and are sent in the K1 directions.

For more descriptions of S501, refer to S31 in the embodiment shown in FIG. 3.

S502: The second terminal apparatus determines that the condition 1, to be specific, that beams in the K1 sending directions all fail for N1 consecutive times, is satisfied. In other words, the second terminal apparatus determines that the beams in the K1 sending directions all fail for the N1 consecutive times.

For example, N1 may be configured by a network device, may be configured by the first terminal apparatus, may be configured by the second terminal apparatus, or may be specified in a protocol. N1 is a positive integer.

After receiving the K2 first reference signals, the second terminal apparatus may measure the K2 first reference signals, and determine, based on measurement results, whether K1 beams fail. For example, the measurement result is an RSRP. If a hypothetical PSCCH BLER corresponding to an RSRP of a first reference signal transmitted in a beam is greater than a first threshold, the second terminal apparatus considers that the beam fails. In this manner, the second terminal apparatus may determine whether the beams in the K1 sending directions all fail for the N1 consecutive times. The first threshold is, for example, equal to the threshold in the BFD condition in step ① described above. Alternatively, the first threshold may be configured by the network device, may be configured by the first terminal apparatus, may be configured by the second terminal apparatus, or may be specified in the protocol.

In this embodiment of this application, for example, the second terminal apparatus determines that the condition 1, to be specific, that the beams in the K1 sending directions all fail for the N1 consecutive times, is satisfied.

S503: The first terminal apparatus sends M2 third reference signals to the second terminal apparatus in M1 sending directions, and the second terminal apparatus receives the M2 third reference signals sent by the first terminal apparatus in the M1 sending directions, in other words, the second terminal apparatus receives M2 third reference signals in M1 directions corresponding to the first terminal apparatus. The M1 directions corresponding to the first terminal apparatus are M1 sending directions of the first terminal apparatus. Therefore, the M2 third reference signals are sent by the first terminal apparatus to the second terminal apparatus, and are sent in the M1 directions.

S501 may occur before S503, S501 may occur after S503, or S501 and S503 may occur simultaneously.

For more descriptions of S503, refer to S35 in the embodiment shown in FIG. 3.

S504: The second terminal apparatus determines that a condition, to be specific, that for N2 consecutive times, none of beams in the M1 sending directions can be used to recover a communication connection, is not satisfied. In other words, the second terminal apparatus determines that the beams in the M1 sending directions can be used to recover the communication connection. N2 is a positive integer.

N2 may be configured by the network device, may be configured by the first terminal apparatus, may be configured by the second terminal apparatus, or may be specified in the protocol.

After receiving M2 second reference signals, the second terminal apparatus may measure the M2 second reference signals, and determine, based on measurement results, whether M1 beams can be used to recover the communication connection. For example, the measurement result is an RSRP. If an RSRP of a second reference signal transmitted in a beam is less than a second threshold, the second terminal apparatus considers that the beam cannot be used to recover the communication connection. In this manner, the second terminal apparatus may determine whether for the N2 consecutive times, none of the beams in the M1 sending directions can be used to recover the communication connection. The second threshold is, for example, equal to the threshold in step ② described above. Alternatively, the second threshold may be configured by the network device, may be configured by the first terminal apparatus, may be configured by the second terminal apparatus, or may be specified in the protocol.

In this embodiment of this application, for example, the second terminal apparatus determines that the condition, to be specific, that for the N2 consecutive times, none of the beams in the M1 sending directions can be used to recover the communication connection, is not satisfied.

S505: The second terminal apparatus sends a BFRR to the first terminal apparatus, and the first terminal apparatus receives the BFRR from the second terminal apparatus.

If the second terminal apparatus determines that the condition 1, to be specific, that the beams in the K1 directions all fail for the N1 consecutive times, is satisfied and that the condition 2, to be specific, that for the N2 consecutive times, none of the beams in the M1 sending directions can be used to recover the communication connection, is not satisfied, the second terminal apparatus may send the BFRR to the first terminal apparatus, and the first terminal apparatus may receive the BFRR from the second terminal apparatus. In this case, the BFRR may indicate that the condition, to be specific, that the beams in the K1 sending directions all fail for the N1 consecutive times, is satisfied, and indicate that the condition, to be specific, that for the N2 consecutive times, none of the beams in the M1 sending directions can be used to recover the communication connection, is not satisfied. Provided that the first terminal apparatus receives the BFRR, the first terminal apparatus may determine that the beams in the K1 sending directions all fail for the N1 consecutive times, and determine that the condition, to be specific, that for the N2 consecutive times, none of the beams in the M1 sending directions can be used to recover the communication connection, is not satisfied. For content such as a manner in which the first terminal apparatus sends the BFRR to the second terminal apparatus, refer to the related descriptions in S32.

S506: The second terminal apparatus determines that no second response message is received, the second terminal apparatus sends P2 second reference signals to the first terminal apparatus, and the first terminal apparatus receives the P2 second reference signals from the second terminal apparatus in P3 receiving directions, where the second response message may be a response message for the BFRR.

The P3 receiving directions correspond to P1 sending directions of the first terminal apparatus. Therefore, it may be considered that the P2 second reference signals correspond to the P1 sending directions of the first terminal apparatus. P1 is a positive integer, and P2 is an integer greater than or equal to P3.

For more content of S506, refer to the related descriptions of S43 in the embodiment shown in FIG. 4.

S507: The first terminal apparatus measures the P2 second reference signals.

For more content of S507, refer to the related descriptions of S44 in the embodiment shown in FIG. 4.

S508: The first terminal apparatus determines, based on measurement results of the P2 second reference signals, whether P1 beams corresponding to the P1 sending directions are available.

For more content of S508, refer to the related descriptions of S47 in the embodiment shown in FIG. 4.

S509: The second terminal apparatus determines, based on the P2 second reference signals, whether the P1 beams corresponding to the P1 sending directions are available.

In an optional implementation, after the first terminal apparatus determines whether the P1 beams are available, S510 may be further performed. In S510, the first terminal apparatus may send a first response message to the second terminal apparatus. The first response message is used to indicate an available beam in the P1 beams or indicate that none of the P1 beams is available. After the second terminal apparatus receives the first response message, if the first response message indicates the available beam in the P1 beams, the second terminal apparatus may determine, based on the first response message, which beam in the P1 beams is available; or if the first response message indicates that none of the P1 beams is available, the second terminal apparatus may determine, based on the first response message, that none of the P1 beams is available. If the first response message indicates the available beam in the P1 beams, a manner is that the first response message includes an identifier of the available beam in the P1 beams, where the identifier of the beam is, for example, an ID of the beam or a number of the beam. The second terminal apparatus may determine, based on the identifier that is of the beam and that is included in the first response message, that the beam corresponding to the identifier is the available beam.

Alternatively, in another optional implementation, after the first terminal apparatus determines whether the P1 beams are available, if there is an available beam in the P1 beams, the first terminal apparatus may send a first response message to the second terminal apparatus, where the first response message is used to indicate the available beam in the P1 beams. After receiving the first response message, the second terminal apparatus may determine, based on the first response message, which beam in the P1 beams is available. However, if there is no available beam in the P1 beams, the first terminal apparatus may skip sending the first response message to the second terminal apparatus. If the second terminal apparatus does not receive the first response message from the first terminal apparatus, the second terminal apparatus may determine that none of the P1 beams is available.

For more content of S509, refer to the related descriptions of S48 in the embodiment shown in FIG. 4.

In this embodiment of this application, the first terminal apparatus may send the first reference signals and the second reference signals to the second terminal apparatus, so that the first terminal apparatus can determine whether the beams in the K1 sending directions fail, and determine whether the beams in the M1 sending directions can be used to recover the communication connection. This is equivalent to providing a beam failure detection mechanism in SL communication. In addition, if the second terminal apparatus determines that the beams in the K1 sending directions fail and the beams in the M1 sending directions can be used to recover the communication connection, the second terminal apparatus sends the BFRR to the first terminal apparatus, so that the first terminal apparatus changes serving beams from the sending beams corresponding to the K1 sending directions to a sending beam that can be used to recover the communication connection and that is in the sending beams corresponding to the M1 sending directions. If the first terminal apparatus determines that the second response message sent by the first terminal apparatus for the BFRR is not received, the second terminal apparatus may not notify a higher layer temporarily, but send the P2 second reference signals to the first terminal apparatus, and the first terminal apparatus receives the P2 second reference signals from the second terminal apparatus in the P3 receiving directions. It may be understood that the K1 sending directions are directions corresponding to the serving beams of the first terminal apparatus, and the P3 receiving directions are a part or all of receiving directions supported by the first terminal apparatus. The first terminal apparatus may support one or more beam correspondences. Each beam correspondence includes one transmit beam and one receive beam, and the transmit beam and the receive beam in the beam correspondence are in a one-to-one correspondence. Therefore, P3 receive beams may correspond to the P1 transmit beams of the first terminal apparatus, and the P3 receiving directions correspond to the P1 sending directions of the first terminal apparatus. A quantity of directions included in the P1 directions may be greater than a quantity of the K1 directions. In other words, if the beams in the K1 directions fail, the first terminal apparatus may continue to determine whether there is an available beam in more directions (namely, the P1 directions). A possibility that there is an available beam in the P1 directions is greater than a possibility that there is an available beam in the K1 directions, so that a possibility of obtaining the available beam is improved. In this manner, the available beam is determined by using a physical layer as much as possible. In other words, beam recovery is performed by using the physical layer. Beam recovery does not need to be performed by using a higher layer, so that beam recovery efficiency is improved, and a service delay caused by a beam failure is also reduced.

Figure 5:
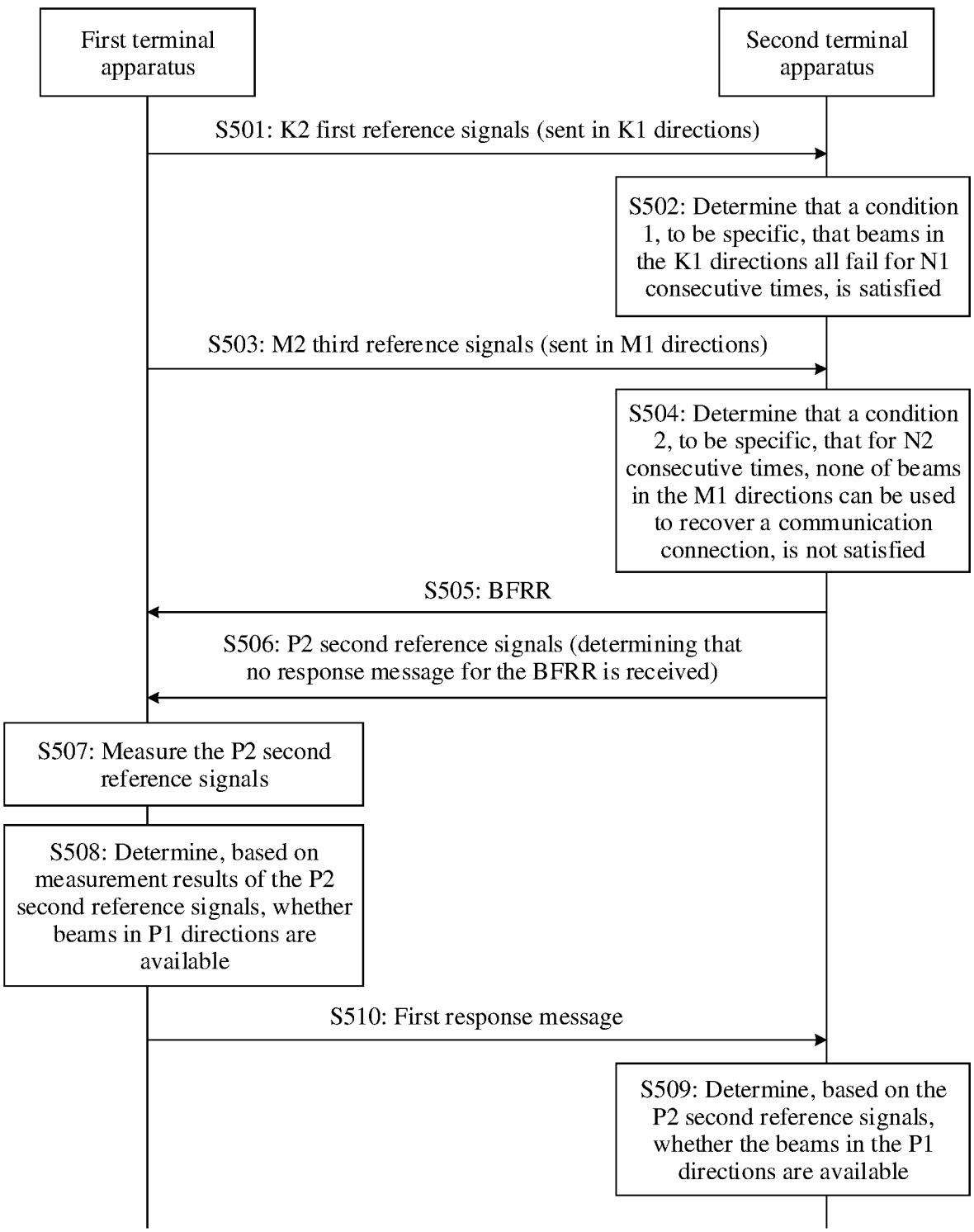
FIG. 5 is a flowchart of a third communication method according to an embodiment of this application.
Figure 6:
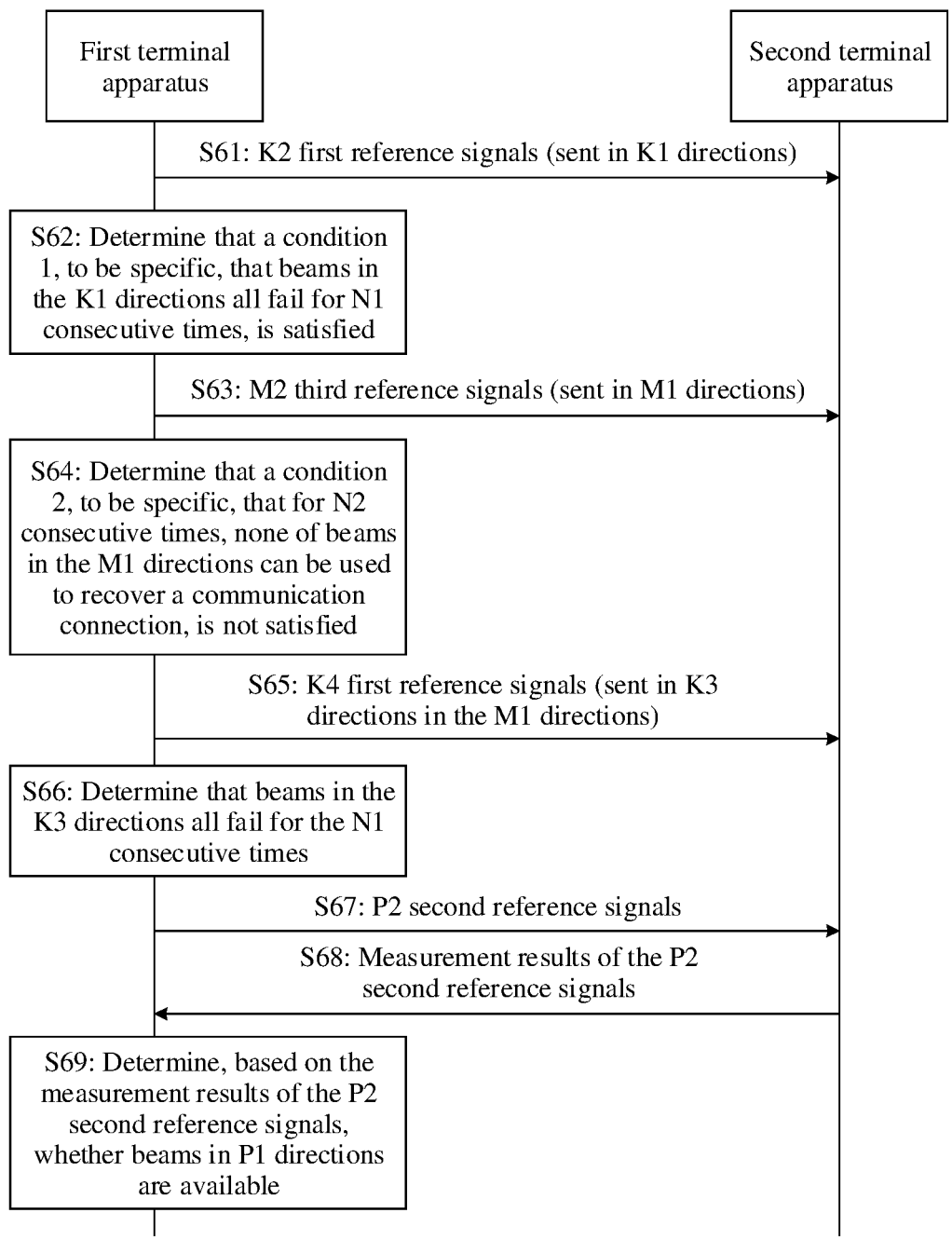
FIG. 6 is a flowchart of a fourth communication method according to an embodiment of this application.

The method provided in the embodiment shown in FIG. 5 is the processing manner used when the second terminal device determines that the condition 1 is satisfied but the condition 2 is not satisfied. An embodiment of this application further provides a fourth communication method below, to describe another processing manner used when the first terminal device determines that the condition 1 is satisfied but the condition 2 is not satisfied. FIG. 6 is a flowchart of the method.

In the following description process, an example in which the method is applied to the network architecture shown in FIG. 2 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device in implementing a function required by the method, may be a terminal device or a communication apparatus that can support the terminal device in implementing a function required by the method, or certainly may be another communication apparatus, for example, a chip. In addition, an implementation of the first communication apparatus or the second communication apparatus is not limited. For example, the two communication apparatuses may be implemented in a same form. For example, the two communication apparatuses are both implemented in a device form. Alternatively, the two communication apparatuses may be implemented in different forms. For example, the first communication apparatus is implemented in a device form, and the second communication apparatus is implemented in a chip form. The network device is, for example, a base station.

For ease of description, in the following descriptions, an example in which the method is performed by terminal apparatuses is used. In other words, an example in which the first communication apparatus is a terminal apparatus (for example, referred to as a first terminal apparatus) and the second communication apparatus is also a terminal apparatus (for example, referred to as a second terminal apparatus) is used. Because this embodiment uses an example in which the method is applied to the network architecture shown in FIG. 2, the first terminal apparatus described below may implement a function of the terminal device 1 in the network architecture shown in FIG. 2, and the second terminal apparatus described below may implement a function of the terminal device 2 in the network architecture shown in FIG. 2.

S61: The first terminal apparatus sends K2 first reference signals to the second terminal apparatus in K1 sending directions, and the second terminal apparatus receives the K2 first reference signals sent by the first terminal apparatus in the K1 sending directions, in other words, the second terminal apparatus receives K2 first reference signals in K1 directions corresponding to the first terminal apparatus. The K1 directions corresponding to the first terminal apparatus are K1 sending directions of the first terminal apparatus. Therefore, the K2 first reference signals are sent by the first terminal apparatus to the second terminal apparatus, and are sent in the K1 directions.

For more descriptions of S61, refer to S31 in the embodiment shown in FIG. 3.

S62: The first terminal apparatus determines that a condition (the condition 1), to be specific, that beams in the K1 sending directions all fail for N1 consecutive times, is satisfied. In other words, the first terminal apparatus determines that the beams in the K1 sending directions all fail for the N1 consecutive times.

For example, N1 may be configured by a network device, may be configured by the first terminal apparatus, may be configured by the second terminal apparatus, or may be specified in a protocol. N1 is a positive integer.

For example, the first terminal apparatus determines, based on a BFRR or measurement results of K2 second reference signals from the second terminal apparatus, that the condition 1, to be specific, that the beams in the K1 sending directions all fail for the N1 consecutive times, is satisfied.

For more descriptions of S62, refer to S32 in the embodiment shown in FIG. 3.

S63: The first terminal apparatus sends M2 third reference signals to the second terminal apparatus in M1 sending directions, and the second terminal apparatus receives the M2 third reference signals sent by the first terminal apparatus in the M1 sending directions, in other words, the second terminal apparatus receives M2 third reference signals in M1 directions corresponding to the first terminal apparatus. The M1 directions corresponding to the first terminal apparatus are M1 sending directions of the first terminal apparatus. Therefore, the M2 third reference signals are sent by the first terminal apparatus to the second terminal apparatus, and are sent in the M1 directions.

For more descriptions of S63, refer to S35 in the embodiment shown in FIG. 3.

S64: The first terminal apparatus determines that a condition (the condition 2), to be specific, that for N2 consecutive times, none of beams in the M1 sending directions can be used to recover a communication connection, is not satisfied. In other words, the first terminal apparatus determines that the beams in the M1 sending directions can be used to recover the communication connection. N2 is a positive integer.

N2 may be configured by the network device, may be configured by the first terminal apparatus, may be configured by the second terminal apparatus, or may be specified in the protocol.

For example, the first terminal apparatus determines, based on the BFRR or measurement results of M2 second reference signals from the second terminal apparatus, that the condition 2, to be specific, that for the N2 consecutive times, none of the beams in the M1 sending directions can be used to recover the communication connection, is not satisfied.

For more descriptions of S64, refer to S36 in the embodiment shown in FIG. 3.

S65: The first terminal apparatus sends K4 first reference signals to the second terminal apparatus by using K3 sending directions in the M1 sending directions, and the second terminal apparatus receives the K4 first reference signals sent by the first terminal apparatus in the K3 sending directions, in other words, the second terminal apparatus receives K4 first reference signals in K3 directions corresponding to the first terminal apparatus. The K3 directions corresponding to the first terminal apparatus are K3 sending directions of the first terminal apparatus. Therefore, the K4 first reference signals are sent by the first terminal apparatus to the second terminal apparatus, and are sent in the K3 directions.

The K3 directions are all sending directions of the first terminal apparatus. Therefore, the K3 directions may also be referred to as K3 sending directions. K3 is a positive integer, and K4 may be an integer greater than or equal to K3. In other words, one or more first reference signals may be sent in one of the K3 directions. One first reference signal in the K4 first reference signals may be used to detect whether a beam in a corresponding direction fails.

Because the first terminal apparatus determines that the beams in the M1 sending directions may be used to recover the communication connection, the first terminal apparatus sends the K4 first reference signals to the second terminal apparatus in the K3 directions in the M1 sending directions. The K3 directions may correspond to K3 beams, in other words, correspond to K3 transmit beams. The K3 beams may be new serving beams of the first terminal apparatus. For example, each of the K3 beams may be used to send a data signal to the second terminal apparatus. For example, the K3 beams are all of serving beams of the first terminal apparatus, or are a part of the serving beams of the first terminal apparatus. In this case, each of the K3 directions may be a direction in which the first terminal apparatus sends a data signal to the second terminal apparatus.

S66: The first terminal apparatus determines that the beams in the K3 directions all fail for the N1 consecutive times.

In other words, the first terminal apparatus may attempt to recover the communication connection in the M1 directions, but the attempt fails. S65 and S66 are optional steps.

For more content of S66, refer to the related descriptions of S32 in the embodiment shown in FIG. 3.

S67: The first terminal apparatus sends P2 second reference signals to the first terminal apparatus in P1 directions, and the second terminal apparatus receives the P2 second reference signals sent by the first terminal apparatus in the P1 directions. P1 directions corresponding to the first terminal apparatus are P1 sending directions of the first terminal apparatus. Therefore, the P2 second reference signals are sent by the first terminal apparatus to the second terminal apparatus, and are sent in the P1 directions.

The P1 directions are all sending directions of the first terminal apparatus. Therefore, the P1 directions may also be referred to as the P1 sending directions. Both P1 and P2 are positive integers, and P2 may be greater than or equal to P1. In other words, one or more first reference signals may be sent in one of the P1 directions.

For more content of S67, refer to the related descriptions of S33 in the embodiment shown in FIG. 3.

S68: The second terminal apparatus sends measurement results of the P2 second reference signals to the first terminal apparatus, and the first terminal apparatus receives the measurement results that are of the P2 second reference signals and that are from the second terminal apparatus.

For more content of S68, refer to the related descriptions of S34 in the embodiment shown in FIG. 3.

S69: The first terminal apparatus determines, based on the measurement results of the P2 second reference signals, whether P1 beams corresponding to the P1 sending directions are available.

For more content of S69, refer to the related descriptions of S37 in the embodiment shown in FIG. 3.

In this embodiment of this application, the first terminal apparatus may send the first reference signals and the second reference signals to the second terminal apparatus, so that the first terminal apparatus can determine whether the beams in the K1 sending directions fail, and determine whether the beams in the M1 sending directions can be used to recover the communication connection. This is equivalent to providing a beam failure detection mechanism in SL communication. In addition, if the second terminal apparatus determines that the beams in the K1 sending directions fail and the beams in the M1 sending directions can be used to recover the communication connection, the second terminal apparatus may send the BFRR to the first terminal apparatus, so that the first terminal apparatus changes serving beams from the sending beams corresponding to the K1 sending directions to the K3 sending beam that can be used to recover the communication connection and that is in the sending beams corresponding to the M1 sending directions. If the first terminal apparatus determines that the K3 beams fail, the first terminal apparatus may not notify a higher layer temporarily, but sends the P2 second reference signals to the second terminal apparatus in the P1 directions, and the second terminal apparatus receives the P2 second reference signals from the second terminal apparatus. A quantity of directions included in the P1 directions may be greater than a quantity of the K1 directions. In other words, if the beams in the K1 directions fail, the first terminal apparatus may continue to determine whether there is an available beam in more directions (namely, the P1 directions). A possibility that there is an available beam in the P1 directions is greater than a possibility that there is an available beam in the K1 directions, so that a possibility of obtaining the available beam is improved. In this manner, the available beam is determined by using a physical layer as much as possible. In other words, beam recovery is performed by using the physical layer. Beam recovery does not need to be performed by using a higher layer, so that beam recovery efficiency is improved, and a service delay caused by a beam failure is also reduced.

Figure 7:
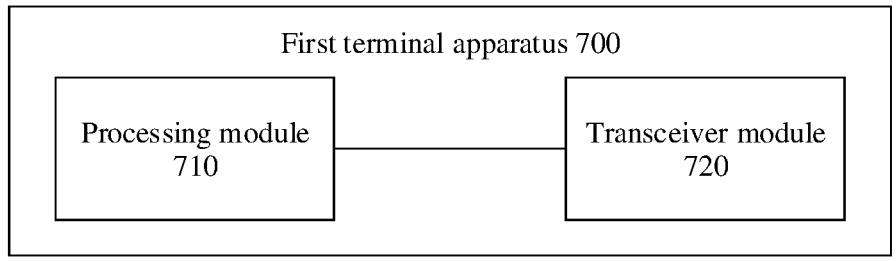
FIG. 7 is a schematic block diagram of a first type of first terminal apparatus according to an embodiment of this application.

FIG. 7 is a schematic block diagram of a communication apparatus 700 according to an embodiment of this application. For example, the communication apparatus 700 is a first terminal apparatus 700.

The first terminal apparatus 700 includes a processing module 710 and a transceiver module 720. For example, the first terminal apparatus 700 may be a terminal device, or may be a chip used in the terminal device, or another combined device or another component that has a function of the terminal device. When the first terminal apparatus 700 is the terminal device, the transceiver module 720 may be a transceiver, and the transceiver may include an antenna, a radio frequency circuit, and the like; and the processing module 710 may be a processor, for example, a baseband processor, and the baseband processor may include one or more central processing units (central processing unit, CPU). When the first terminal apparatus 700 is the component that has the function of the terminal device, the transceiver module 720 may be a radio frequency unit, and the processing module 710 may be a processor, for example, a baseband processor. When the first terminal apparatus 700 is a chip system, the transceiver module 720 may be an input/output interface of a chip (for example, a baseband chip), and the processing module 710 may be a processor of the chip system, and may include one or more central processing units. It should be understood that the processing module 710 in this embodiment of this application may be implemented by a processor or a processor-related circuit component, and the transceiver module 720 may be implemented by a transceiver or a transceiver-related circuit component.

The processing module 710 may be configured to perform all operations other than sending and receiving operations performed by the first terminal apparatus in the embodiment shown in FIG. 3, for example, S32, S36, and S37, and/or configured to support another process of the technology described in this specification. The transceiver module 720 may be configured to perform all receiving operations performed by the first terminal apparatus in the embodiment shown in FIG. 3, for example, S31 and S33 to S35, and/or configured to support another process of the technology described in this specification.

Alternatively, the processing module 710 may be configured to perform all operations other than sending and receiving operations performed by the first terminal apparatus in the embodiment shown in FIG. 5, for example, S507 and S508, and/or configured to support another process of the technology described in this specification. The transceiver module 720 may be configured to perform all receiving operations performed by the first terminal apparatus in the embodiment shown in FIG. 5, for example, S501, S503, S506, and S510, and/or configured to support another process of the technology described in this specification.

Alternatively, the processing module 710 may be configured to perform all operations other than sending and receiving operations performed by the first terminal apparatus in the embodiment shown in FIG. 6, for example, S62, S64, S66, and S69, and/or configured to support another process of the technology described in this specification. The transceiver module 720 may be configured to perform all receiving operations performed by the first terminal apparatus in the embodiment shown in FIG. 6, for example, S61, S63, S65, S67, and S68, and/or configured to support another process of the technology described in this specification.

In addition, the transceiver module 720 may be a function module, and the function module can complete both a sending operation and a receiving operation. For example, the transceiver module 720 may be configured to perform all sending operations and receiving operations performed by the first terminal apparatus in the embodiment shown in FIG. 3, the embodiment shown in FIG. 5, or the embodiment shown in FIG. 6. For example, when performing the sending operations, the transceiver module 720 may be considered as a sending module; when performing the receiving operations, the transceiver module 720 may be considered as a receiving module. Alternatively, the transceiver module 720 may be two function modules. The transceiver module may be considered as a general term of the two function modules. The two function modules are a sending module and a receiving module. The sending module is configured to complete a sending operation. For example, the sending module may be configured to perform all sending operations performed by the first terminal apparatus in the embodiment shown in FIG. 3, the embodiment shown in FIG. 5, or the embodiment shown in FIG. 6. The receiving module is configured to complete a receiving operation. For example, the receiving module may be configured to perform all receiving operations performed by the first terminal apparatus in the embodiment shown in FIG. 3, the embodiment shown in FIG. 5, or the embodiment shown in FIG. 6.

The transceiver module 720 is configured to send K2 first reference signals to a second terminal apparatus in K1 directions, where each of the K1 directions is a direction in which the first terminal apparatus 700 sends a data signal to the second terminal apparatus, one first reference signal in the K2 first reference signals is used to detect whether a beam in a direction in which the first reference signal is located fails, both K1 and K2 are positive integers, and K2 is greater than or equal to K1.

The processing module 710 is configured to determine that beams in the K1 directions all fail for N1 consecutive times, where N1 is a positive integer.

The transceiver module 720 is further configured to send P2 second reference signals to the second terminal apparatus in P1 directions, where one second reference signal in the P2 second reference signals is used to measure quality of a beam in a direction in which the first reference signal is located, the P1 directions are a part or all of sending directions supported by the first terminal apparatus 700, P1 is a positive integer, and P2 is an integer greater than or equal to P1.

The transceiver module 720 is further configured to receive measurement results that are of the P2 second reference signals and that are from the second terminal apparatus.

The processing module 710 is further configured to determine, based on the measurement results of the P2 second reference signals, whether P1 beams corresponding to the P1 directions are available.

In an optional implementation, the transceiver module 720 is further configured to send a second message to the second terminal apparatus, where the second message is used to indicate an available beam in the P1 beams or indicate that none of the P1 beams is available; or the processing module 710 is further configured to: when determining that none of the P1 beams is available, control the transceiver module 720 to skip sending a second message to the second terminal apparatus.

In an optional implementation, the processing module 710 is further configured to recover one or more of the P1 beams by using an RRC layer of the first terminal apparatus 700.

In an optional implementation, the processing module 710 is configured to determine, in the following manner, that the beams in the K1 directions all fail for the N1 consecutive times: receiving a first message from the second terminal apparatus by using the transceiver module 720, where the first message is used to indicate results of measuring the K2 first reference signals by the second terminal apparatus; and determining, based on the measurement results of the K2 first reference signals, that the beams in the K1 directions all fail for the N1 consecutive times.

In an optional implementation, the transceiver module 720 is further configured to send M2 third reference signals to the second terminal apparatus in M1 directions, where one third reference signal in the M2 third reference signals is used to detect whether a beam in a direction in which the third reference signal is located can be used to recover a communication connection, M1 is a positive integer, and M2 is an integer greater than or equal to M1; and the processing module 710 is further configured to determine that for N2 consecutive times, none of beams in the M1 directions can be used to recover the communication connection, where N2 is a positive integer.

In an optional implementation, the processing module is configured to: in the following manner, determine that the beams in the K1 directions all fail for the N1 consecutive times and determine that for the N2 consecutive times, none of the beams in the M1 directions can be used to recover the communication connection: receiving, by using the transceiver module 720, a BFRR from the second terminal apparatus, where the BFRR indicates that the beams in the K1 directions all fail for the N1 consecutive times and that for the N2 consecutive times, none of the beams in the M1 directions can be used to recover the communication connection.

In an optional implementation, the transceiver module 720 is further configured to send a second response message to the second terminal apparatus, where the second response message is a response message for the BFRR.

Figure 8:
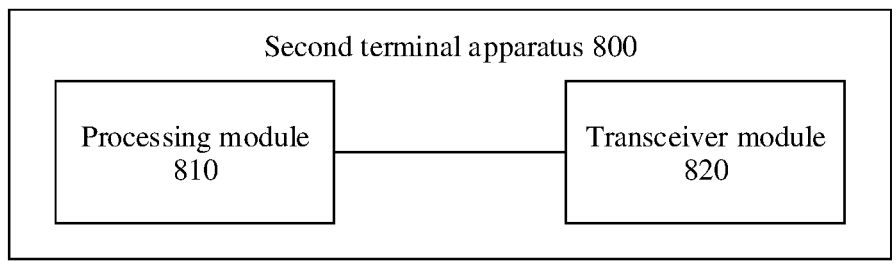
FIG. 8 is a schematic block diagram of a first type of second terminal apparatus according to an embodiment of this application.

FIG. 8 is a schematic block diagram of a communication apparatus 800 according to an embodiment of this application. For example, the communication apparatus 800 is a second terminal apparatus 800.

The second terminal apparatus 800 includes a processing module 810 and a transceiver module 820. For example, the second terminal apparatus 800 may be a terminal device, or may be a chip used in the terminal device, or another combined device or another component that has a function of the terminal device. When the second terminal apparatus 800 is the terminal device, the transceiver module 820 may be a transceiver, and the transceiver may include an antenna, a radio frequency circuit, and the like; and the processing module 810 may be a processor, and the processor may include one or more CPUs. When the second terminal apparatus 800 is the component that has the function of the terminal device, the transceiver module 820 may be a radio frequency unit, and the processing module 810 may be a processor, for example, a baseband processor. When the second terminal apparatus 800 is a chip system, the transceiver module 820 may be an input/output interface of a chip (for example, a baseband chip), and the processing module 810 may be a processor of the chip system, and may include one or more central processing units. It should be understood that the processing module 810 in this embodiment of this application may be implemented by a processor or a processor-related circuit component, and the transceiver module 820 may be implemented by a transceiver or a transceiver-related circuit component.

The processing module 810 may be configured to perform all operations other than sending and receiving operations performed by the second terminal apparatus in the embodiment shown in FIG. 3, for example, measure P2 second reference signals, and/or configured to support another process of the technology described in this specification. The transceiver module 820 may be configured to perform all receiving operations performed by the second terminal apparatus in the embodiment shown in FIG. 3, for example, S31 and S33 to S35, and/or configured to support another process of the technology described in this specification.

Alternatively, the processing module 810 may be configured to perform all operations other than sending and receiving operations performed by the second terminal apparatus in the embodiment shown in FIG. 5, for example, S502, S504, and S509, and/or configured to support another process of the technology described in this specification. The transceiver module 820 may be configured to perform all receiving operations performed by the second terminal apparatus in the embodiment shown in FIG. 5, for example, S501, S503, S506, and S510, and/or configured to support another process of the technology described in this specification.

Alternatively, the processing module 810 may be configured to perform all operations other than sending and receiving operations performed by the second terminal apparatus in the embodiment shown in FIG. 6, for example, S62, S64, S66, and S69, and/or configured to support another process of the technology described in this specification. The transceiver module 820 may be configured to perform all receiving operations performed by the second terminal apparatus in the embodiment shown in FIG. 6, for example, S61, S63, S65, S67, and S68, and/or configured to support another process of the technology described in this specification.

In addition, the transceiver module 820 may be a function module, and the function module can complete both a sending operation and a receiving operation. For example, the transceiver module 820 may be configured to perform all sending operations and receiving operations performed by the second terminal apparatus in the embodiment shown in FIG. 3, the embodiment shown in FIG. 5, or the embodiment shown in FIG. 6. For example, when performing the sending operations, the transceiver module 820 may be considered as a sending module; when performing the receiving operations, the transceiver module 820 may be considered as a receiving module. Alternatively, the transceiver module 820 may be two function modules. The transceiver module may be considered as a general term of the two function modules. The two function modules are a sending module and a receiving module. The sending module is configured to complete a sending operation. For example, the sending module may be configured to perform all sending operations performed by the second terminal apparatus in the embodiment shown in FIG. 3, the embodiment shown in FIG. 5, or the embodiment shown in FIG. 6. The receiving module is configured to complete a receiving operation. For example, the receiving module may be configured to perform all receiving operations performed by the second terminal apparatus in the embodiment shown in FIG. 3, the embodiment shown in FIG. 5, or the embodiment shown in FIG. 6.

The transceiver module 820 is configured to receive K2 first reference signals in K1 directions corresponding to a first terminal apparatus, where each of the K1 directions is a direction in which the first terminal apparatus sends a data signal to the second terminal apparatus 800, one first reference signal in the K2 first reference signals is used to detect whether a beam in a direction in which the first reference signal is located fails, K1 is a positive integer, and K2 is an integer greater than or equal to K1.

The transceiver module 820 is further configured to send a first message or a BFRR to the first terminal apparatus, where the first message is used to indicate results of measuring the K2 first reference signals by the second terminal apparatus 800, and the BFRR is used to indicate that beams in the K1 directions all fail for N1 consecutive times.

The transceiver module 820 is further configured to receive P2 second reference signals in P1 directions corresponding to the first terminal apparatus, where one second reference signal in the P2 second reference signals is used to measure quality of a beam in a direction in which the second reference signal is located, the P1 directions are all or a part of sending directions supported by the first terminal apparatus, P1 is a positive integer, and P2 is an integer greater than or equal to P1.

The processing module 810 is configured to measure the P2 second reference signals.

The transceiver module 820 is further configured to send measurement results of the P2 second reference signals to the first terminal apparatus, where the measurement results of the P2 second reference signals are used to determine whether there is an available beam in P1 beams.

In an optional implementation, the transceiver module 820 is further configured to receive a second message from the first terminal apparatus, where the second message is used to indicate the available beam in the P1 beams or indicate that none of the P1 beams is available; or the processing module 810 is further configured to: when determining that the transceiver module 820 does not receive a second message from the first terminal apparatus, determine that none of the P1 beams is available.

In an optional implementation, the transceiver module 820 is further configured to recover one or more of the P1 beams by using an RRC layer of the second terminal apparatus 800.

In an optional implementation, the transceiver module 820 is further configured to receive M2 third reference signals from the first terminal apparatus in M1 directions, where the third reference signal is used to detect whether a beam in a corresponding direction can be used to recover a communication connection, M1 is a positive integer, and M2 is an integer greater than or equal to M1.

In an optional implementation, the transceiver module 820 is further configured to send a fourth message or the BFRR to the first terminal apparatus, where the fourth message is used to indicate results of measuring the M2 third reference signals by the second terminal apparatus 800, and the BFRR is further used to indicate that for N2 consecutive times, none of beams in the M1 directions can be used to recover the communication connection.

Figure 9:
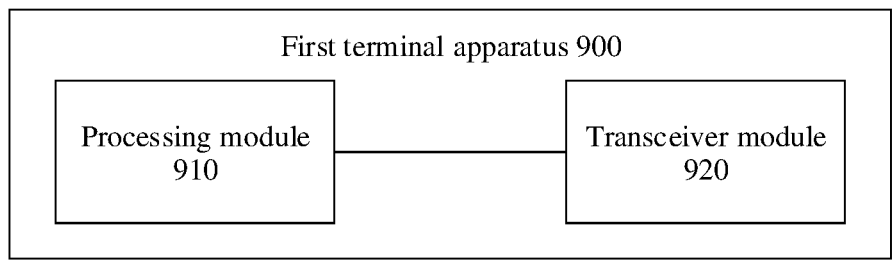
FIG. 9 is a schematic block diagram of a second type of first terminal apparatus according to an embodiment of this application.

FIG. 9 is a schematic block diagram of a communication apparatus 900 according to an embodiment of this application. For example, the communication apparatus 900 is a first terminal apparatus 900.

The first terminal apparatus 900 includes a processing module 910 and a transceiver module 920. For example, the first terminal apparatus 900 may be a terminal device, or may be a chip used in the terminal device, or another combined device or another component that has a function of the terminal device. When the first terminal apparatus 900 is the terminal device, the transceiver module 920 may be a transceiver, and the transceiver may include an antenna, a radio frequency circuit, and the like; and the processing module 910 may be a processor, for example, a baseband processor, and the baseband processor may include one or more CPUs. When the first terminal apparatus 900 is the component that has the function of the terminal device, the transceiver module 920 may be a radio frequency unit, and the processing module 910 may be a processor, for example, a baseband processor. When the first terminal apparatus 900 is a chip system, the transceiver module 920 may be an input/output interface of a chip (for example, a baseband chip), and the processing module 910 may be a processor of the chip system, and may include one or more central processing units. It should be understood that the processing module 910 in this embodiment of this application may be implemented by a processor or a processor-related circuit component, and the transceiver module 920 may be implemented by a transceiver or a transceiver-related circuit component.

The processing module 910 may be configured to perform all operations other than sending and receiving operations performed by the first terminal apparatus in the embodiment shown in FIG. 4, for example, S44 and S47, and/or configured to support another process of the technology described in this specification. The transceiver module 920 may be configured to perform all receiving operations performed by the first terminal apparatus in the embodiment shown in FIG. 4, for example, S41, S43, S45, and S49, and/or configured to support another process of the technology described in this specification.

In addition, the transceiver module 920 may be a function module, and the function module can complete both a sending operation and a receiving operation. For example, the transceiver module 920 may be configured to perform all sending operations and receiving operations performed by the first terminal apparatus in the embodiment shown in FIG. 4. For example, when performing the sending operations, the transceiver module 920 may be considered as a sending module; when performing the receiving operations, the transceiver module 920 may be considered as a receiving module. Alternatively, the transceiver module 920 may be two function modules. The transceiver module may be considered as a general term of the two function modules. The two function modules are a sending module and a receiving module. The sending module is configured to complete a sending operation. For example, the sending module may be configured to perform all sending operations performed by the first terminal apparatus in the embodiment shown in FIG. 4. The receiving module is configured to complete a receiving operation. For example, the receiving module may be configured to perform all receiving operations performed by the first terminal apparatus in the embodiment shown in FIG. 4.

The transceiver module 920 is configured to send K2 first reference signals to a second terminal apparatus in K1 sending directions, where each of the K1 directions is a direction in which the first terminal apparatus 900 sends a data signal to the second terminal apparatus, one first reference signal in the K2 first reference signals is used to detect whether a beam in a sending direction in which the first reference signal is located fails, both K1 and K2 are positive integers, and K2 is greater than or equal to K1.

The transceiver module 920 is further configured to receive P2 second reference signals from the second terminal apparatus in P3 receiving directions, where the P3 receiving directions correspond to P1 sending directions of the first terminal apparatus 900, one second reference signal in the P2 second reference signals is used to measure quality of a beam in a receiving direction that is of the first terminal apparatus 900 and in which the second reference signal is located, the quality of the beam in the receiving direction of the first terminal apparatus 900 corresponds to quality of a beam in one sending direction of the first terminal apparatus 900, the P1 sending directions are a part or all of sending directions supported by the first terminal apparatus 900, P1 is a positive integer, and P2 is an integer greater than or equal to P3.

The processing module 910 is configured to measure the P2 second reference signals.

The processing module 910 is further configured to determine, based on measurement results of the P2 second reference signals, whether P1 beams corresponding to the P1 sending directions are available.

In an optional implementation, the transceiver module 920 is further configured to send a first response message to the second terminal apparatus, where the first response message is used to indicate an available beam in the P1 beams or used to indicate that none of the P1 beams is available; or the processing module 910 is further configured to: when determining that none of the P1 beams is available, control the transceiver module 920 to skip sending a first response message to the second terminal apparatus.

In an optional implementation, the transceiver module 920 is further configured to send M2 third reference signals to the second terminal apparatus in M1 sending directions, where one third reference signal in the M2 third reference signals is used to detect whether a beam in a sending direction in which the third reference signal is located can be used to recover a communication connection, M1 is a positive integer, and M2 is an integer greater than or equal to M1.

In an optional implementation, the processing module 910 is further configured to recover one or more of the P1 beams by using an RRC layer of the first terminal apparatus 900.

Figure 10:
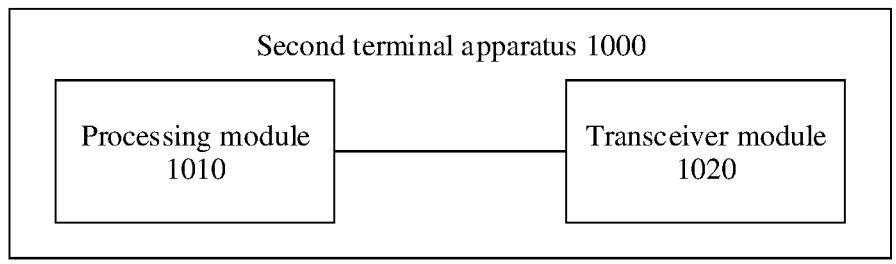
FIG. 10 is a schematic block diagram of a second type of second terminal apparatus according to an embodiment of this application.

FIG. 10 is a schematic block diagram of a communication apparatus 1000 according to an embodiment of this application. For example, the communication apparatus 1000 is a second terminal apparatus 1000.

The second terminal apparatus 1000 includes a processing module 1010 and a transceiver module 1020. For example, the second terminal apparatus 900 may be a terminal device, or may be a chip used in the terminal device, or another combined device or another component that has a function of the terminal device. When the second terminal apparatus 1000 is the terminal device, the transceiver module 1020 may be a transceiver, and the transceiver may include an antenna, a radio frequency circuit, and the like; and the processing module 1010 may be a processor, for example, a baseband processor, and the baseband processor may include one or more CPUs. When the second terminal apparatus 1000 is the component that has the function of the terminal device, the transceiver module 1020 may be a radio frequency unit, and the processing module 1010 may be a processor, for example, a baseband processor. When the second terminal apparatus 1000 is a chip system, the transceiver module 1020 may be an input/output interface of a chip (for example, a baseband chip), and the processing module 1010 may be a processor of the chip system, and may include one or more central processing units. It should be understood that the processing module 1010 in this embodiment of this application may be implemented by a processor or a processor-related circuit component, and the transceiver module 1020 may be implemented by a transceiver or a transceiver-related circuit component.

The processing module 1010 may be configured to perform all operations other than sending and receiving operations performed by the second terminal apparatus in the embodiment shown in FIG. 4, for example, S42 and S46, and/or configured to support another process of the technology described in this specification. The transceiver module 1020 may be configured to perform all receiving operations performed by the second terminal apparatus in the embodiment shown in FIG. 4, for example, S41, S43, S45, and S49, and/or configured to support another process of the technology described in this specification.

In addition, the transceiver module 1020 may be a function module, and the function module can complete both a sending operation and a receiving operation. For example, the transceiver module 1020 may be configured to perform all sending operations and receiving operations performed by the second terminal apparatus in the embodiment shown in FIG. 4. For example, when performing the sending operations, the transceiver module 1020 may be considered as a sending module; when performing the receiving operations, the transceiver module 1020 may be considered as a receiving module. Alternatively, the transceiver module 1020 may be two function modules. The transceiver module may be considered as a general term of the two function modules. The two function modules are a sending module and a receiving module. The sending module is configured to complete a sending operation. For example, the sending module may be configured to perform all sending operations performed by the second terminal apparatus in the embodiment shown in FIG. 4. The receiving module is configured to complete a receiving operation. For example, the receiving module may be configured to perform all receiving operations performed by the second terminal apparatus in the embodiment shown in FIG. 4.

The transceiver module 1020 is configured to receive K2 first reference signals in K1 sending directions corresponding to a first terminal apparatus, where each of the K1 directions is a direction in which the first terminal apparatus sends a data signal to the second terminal apparatus 1000, one first reference signal in the K2 first reference signals is used to detect whether a beam in a sending direction in which the first reference signal is located fails, K1 is a positive integer, and K2 is an integer greater than or equal to K1.

The processing module 1010 is configured to determine that beams in the K1 sending directions all fail for N1 consecutive times, where N1 is a positive integer.

The transceiver module 1020 is further configured to send P2 second reference signals to the first terminal apparatus, where the P2 reference signals correspond to P1 sending directions of the first terminal apparatus, the P1 sending directions are a part or all of sending directions supported by the first terminal apparatus, one second reference signal in the P2 second reference signals is used to measure quality of a beam in a receiving direction that is of the first terminal apparatus and in which the second reference signal is located, the quality of the beam in the receiving direction of the first terminal apparatus corresponds to quality of a beam in one sending direction of the first terminal apparatus, P1 is a positive integer, and P2 is an integer greater than or equal to P3.

The processing module 1010 is further configured to determine, based on the P2 second reference signals, whether P1 beams corresponding to the P1 sending directions are available.

In an optional implementation, the processing module 1010 is configured to determine, based on the P2 second reference signals in the following manner, whether the P1 beams corresponding to the P1 sending directions are available: receiving a first response message from the first terminal apparatus by using the transceiver module 1020, where the first response message is used to indicate an available beam in the P1 beams or used to indicate that none of the P1 beams is available; or if it is determined that the transceiver module 1020 does not receive a first response message from the first terminal apparatus, determining that none of the P1 beams is available.

In an optional implementation, the transceiver module 1020 is further configured to receive M2 third reference signals in M1 sending directions corresponding to the first terminal apparatus, where one third reference signal in the M2 third reference signals is used to detect whether a beam in a sending direction in which the third reference signal is located can be used to recover a communication connection, M1 is a positive integer, and M2 is an integer greater than or equal to M1; and the processing module 1010 is further configured to determine that for N2 consecutive times, none of beams in the M1 sending directions can be used to recover the communication connection, where N2 is a positive integer.

In an optional implementation, the processing module 1010 is further configured to recover one or more of the P1 beams by using an RRC layer of the second terminal apparatus 1000.

An embodiment of this application further provides a communication apparatus. The communication apparatus may be a terminal device, or may be a circuit. The communication apparatus may be configured to perform an action performed by the terminal device in the foregoing method embodiments.

Figure 11:
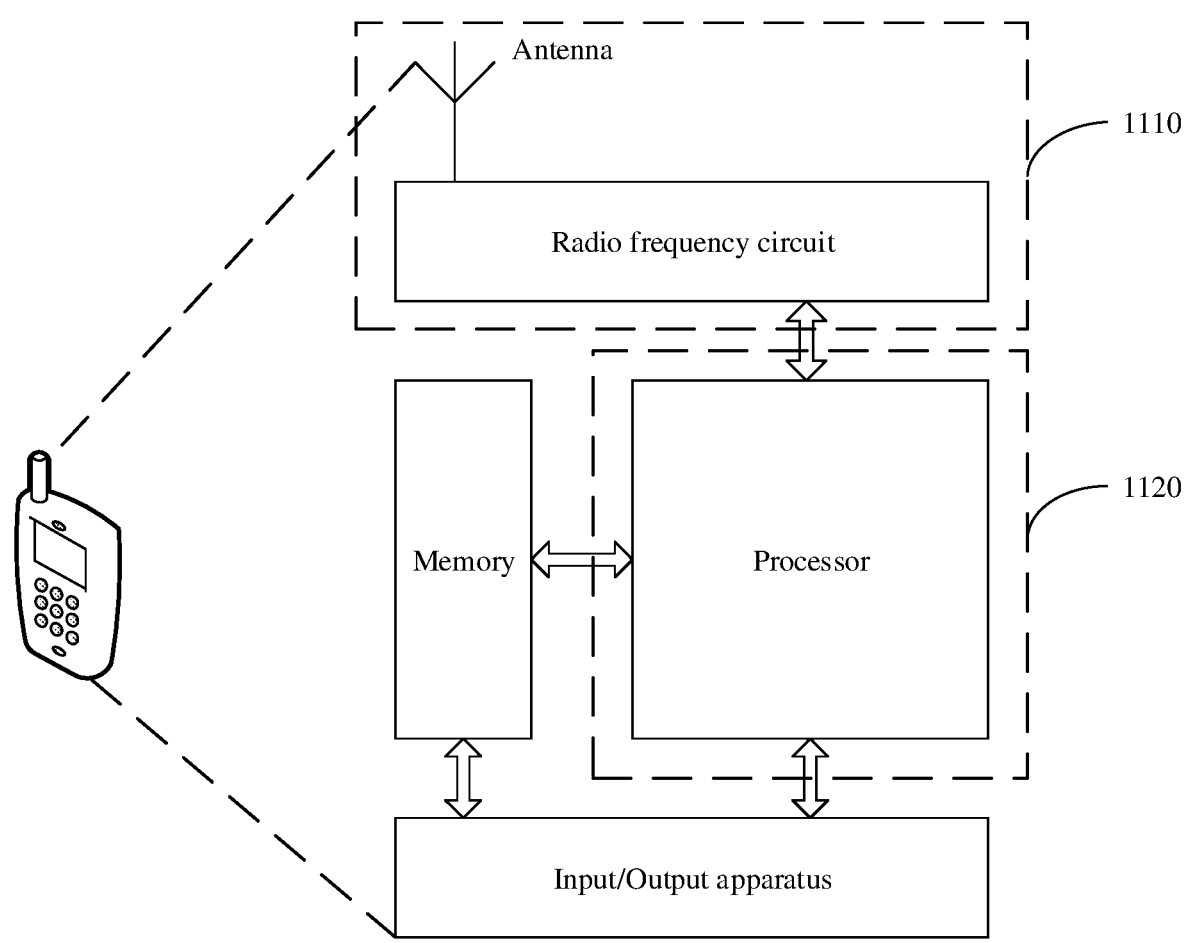
FIG. 11 is a schematic block diagram of a communication apparatus according to an embodiment of this application.

When the communication apparatus is the terminal device, FIG. 11 is a simplified schematic diagram of a structure of a terminal device. For ease of understanding and ease of illustration, an example in which the terminal device is a mobile phone is used in FIG. 11. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user. It should be noted that some types of terminal devices may have no input/output apparatus.

When data needs to be sent, the processor performs baseband processing on to-be-sent data, and then outputs the baseband signal to the radio frequency circuit. After performing radio frequency processing on the baseband signal, the radio frequency circuit sends the radio frequency signal to the outside by using the antenna in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 11 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be a functional unit, and the functional unit can implement a sending function and a receiving function; or the transceiver unit may include two functional units: a receiving unit that can implement a receiving function and a sending unit that can implement a sending function), and a processor that has a processing function is considered as a processing unit of the terminal device. As shown in FIG. 11, the terminal device includes a transceiver unit 1110 and a processing unit 1120. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver, a transceiver, a transceiver circuit, or the like. The receiving unit sometimes may also be referred to as a receiver, a receiver, a receiver circuit, or the like. The sending unit may also be sometimes referred to as a transmitter, a transmitter, a transmitter, a transmit circuit, or the like.

It should be understood that the transceiver unit 1110 is configured to perform the sending operation and the receiving operation on a first terminal apparatus side in the foregoing method embodiments, and the processing unit 1120 is configured to perform an operation other than sending and receiving operations of the first terminal apparatus in the foregoing method embodiments.

For example, in an implementation, the processing unit 1120 may be configured to perform all operations other than sending and receiving operations performed by the first terminal apparatus in the embodiment shown in FIG. 3, for example, S32, S36, and S37, and/or configured to support another process of the technology described in this specification. The transceiver unit 1100 may be configured to perform all receiving operations performed by the first terminal apparatus in the embodiment shown in FIG. 3, for example, S31 and S33 to S35, and/or configured to support another process of the technology described in this specification.

For another example, in an implementation, the processing unit 1120 may be configured to perform all operations other than sending and receiving operations performed by the first terminal apparatus in the embodiment shown in FIG. 5, for example, S507 and S508, and/or configured to support another process of the technology described in this specification. The transceiver unit 1110 may be configured to perform all receiving operations performed by the first terminal apparatus in the embodiment shown in FIG. 5, for example, S501, S503, S506, and S510, and/or configured to support another process of the technology described in this specification.

For another example, in an implementation, the processing unit 1120 may be configured to perform all operations other than sending and receiving operations performed by the first terminal apparatus in the embodiment shown in FIG. 6, for example, S62, S64, S66, and S69, and/or configured to support another process of the technology described in this specification. The transceiver unit 1110 may be configured to perform all receiving operations performed by the first terminal apparatus in the embodiment shown in FIG. 6, for example, S61, S63, S65, S67, and S68, and/or configured to support another process of the technology described in this specification.

For another example, in an implementation, the processing unit 1120 may be configured to perform all operations other than sending and receiving operations performed by the first terminal apparatus in the embodiment shown in FIG. 4, for example, S44 and S47, and/or configured to support another process of the technology described in this specification. The transceiver unit 1110 may be configured to perform all receiving operations performed by the first terminal apparatus in the embodiment shown in FIG. 4, for example, S41, S43, S45, and S49, and/or configured to support another process of the technology described in this specification.

Alternatively, the transceiver unit 1110 is configured to perform the sending operation and the receiving operation on a second terminal apparatus side in the foregoing method embodiments, and the processing unit 1120 is configured to perform an operation other than sending and receiving operations of the second terminal apparatus in the foregoing method embodiments.

For example, in an implementation, the processing unit 1120 may be configured to perform all operations other than sending and receiving operations performed by the second terminal apparatus in the embodiment shown in FIG. 3, for example, measure P2 second reference signals, and/or configured to support another process of the technology described in this specification. The transceiver unit 1110 may be configured to perform all receiving operations performed by the second terminal apparatus in the embodiment shown in FIG. 3, for example, S31 and S33 to S35, and/or configured to support another process of the technology described in this specification.

For another example, in an implementation, the processing unit 1120 may be configured to perform all operations other than sending and receiving operations performed by the second terminal apparatus in the embodiment shown in FIG. 5, for example, S502, S504, and S509, and/or configured to support another process of the technology described in this specification. The transceiver unit 1110 may be configured to perform all receiving operations performed by the second terminal apparatus in the embodiment shown in FIG. 5, for example, S501, S503, S506, and S510, and/or configured to support another process of the technology described in this specification.

For another example, in an implementation, the processing unit 1120 may be configured to perform all operations other than sending and receiving operations performed by the second terminal apparatus in the embodiment shown in FIG. 6, for example, S62, S64, S66, and S69, and/or configured to support another process of the technology described in this specification. The transceiver unit 1110 may be configured to perform all receiving operations performed by the second terminal apparatus in the embodiment shown in FIG. 6, for example, S61, S63, S65, S67, and S68, and/or configured to support another process of the technology described in this specification.

For another example, in an implementation, the processing unit 1120 may be configured to perform all operations other than sending and receiving operations performed by the second terminal apparatus in the embodiment shown in FIG. 4, for example, S42 and S46, and/or configured to support another process of the technology described in this specification. The transceiver unit 1110 may be configured to perform all receiving operations performed by the second terminal apparatus in the embodiment shown in FIG. 4, for example, S41, S43, S45, and S49, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 12:
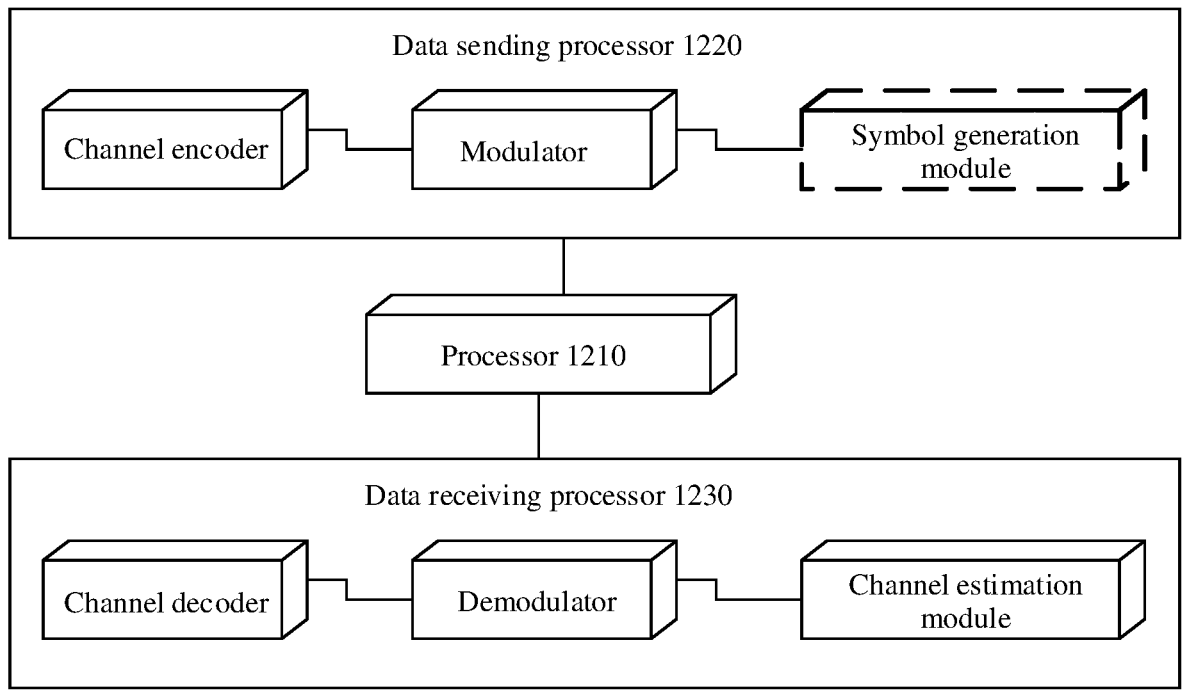
FIG. 12 is another schematic block diagram of a communication apparatus according to an embodiment of this application.

When the communication apparatus in this embodiment is the terminal device, refer to a device shown in FIG. 12. In an example, the device may implement a function similar to that of the processing module 710 in FIG. 7. In another example, the device may implement a function similar to that of the processing module 810 in FIG. 8. In still another example, the device may implement a function similar to that of the processing module 910 in FIG. 9. In yet another example, the device may implement a function similar to that of the processing module 1010 in FIG. 10. In FIG. 12, the device includes a processor 1210, a data sending processor 1220, and a data receiving processor 1230. The processing module 710 in the foregoing embodiment may be the processor 1210 in FIG. 12, and implement a corresponding function. The transceiver module 720 in the foregoing embodiment may be the data sending processor 1220 and/or the data receiving processor 1230 in FIG. 12, and implement a corresponding function. Alternatively, the processing module 810 in the foregoing embodiment may be the processor 1210 in FIG. 12, and implement a corresponding function. The transceiver module 820 in the foregoing embodiment may be the data sending processor 1220 and/or the data receiving processor 1230 in FIG. 12, and implement a corresponding function. Alternatively, the processing module 910 in the foregoing embodiment may be the processor 1210 in FIG. 12, and implement a corresponding function. The transceiver module 920 in the foregoing embodiment may be the data sending processor 1220 and/or the data receiving processor 1230 in FIG. 12, and implement a corresponding function. Alternatively, the processing module 1010 in the foregoing embodiment may be the processor 1210 in FIG. 12, and implement a corresponding function. The transceiver module 1020 in the foregoing embodiment may be the data sending processor 1220 and/or the data receiving processor 1230 in FIG. 12, and implement a corresponding function. Although FIG. 12 shows a channel encoder and a channel decoder, it may be understood that the modules are merely examples, and do not constitute a limitation on this embodiment.

Figure 13:
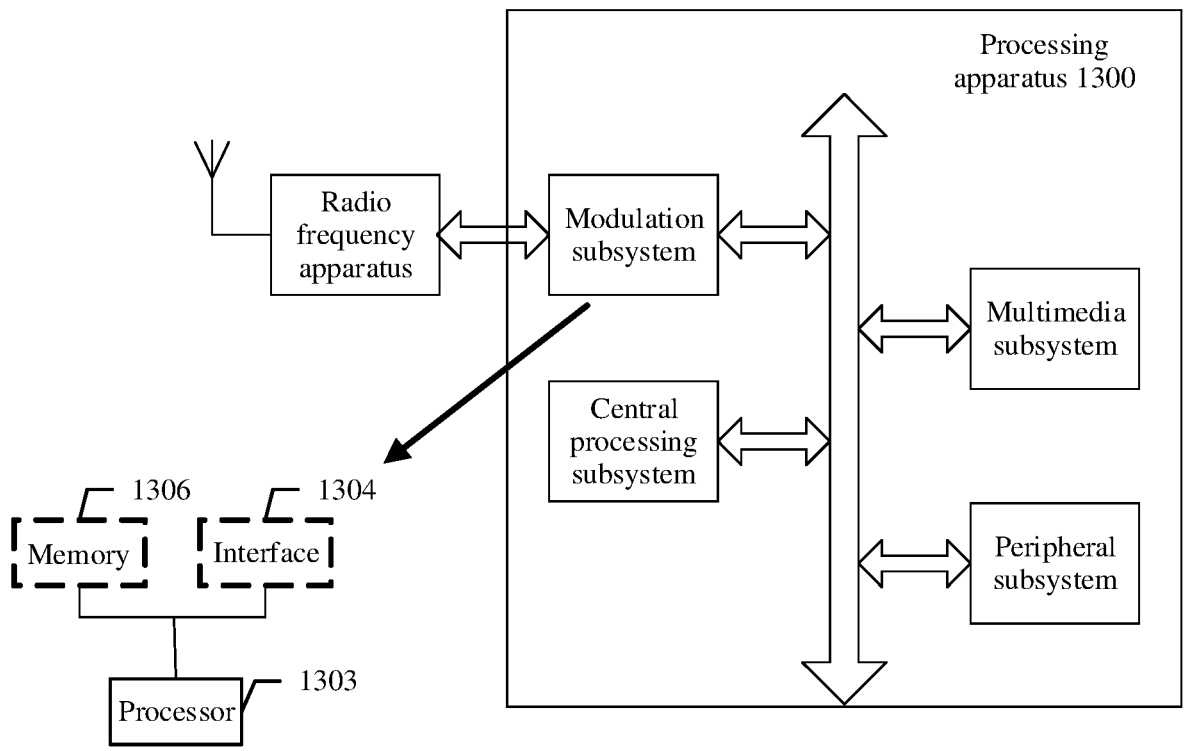
FIG. 13 is still another schematic block diagram of a communication apparatus according to an embodiment of this application.

FIG. 13 shows another form of this embodiment. A processing apparatus 1300 includes modules such as a modulation subsystem, a central processing subsystem, and a peripheral subsystem. The communication apparatus in this embodiment may be used as the modulation subsystem in the processing apparatus 1300. Specifically, the modulation subsystem may include a processor 1303 and an interface 1304. The processor 1303 implements a function of the processing module 710, and the interface 1304 implements a function of the transceiver module 720. Alternatively, the processor 1303 implements a function of the processing module 810, and the interface 1304 implements a function of the transceiver module 820. Alternatively, the processor 1303 implements a function of the processing module 910, and the interface 1304 implements a function of the transceiver module 920. Alternatively, the processor 1303 implements a function of the processing module 1010, and the interface 1304 implements a function of the transceiver module 1020. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a non-volatile memory or a volatile memory. The memory 1306 may be located in the modulation subsystem, or may be located in the processing apparatus 1300, provided that the memory 1306 can be connected to the processor 1303.

An embodiment of this application provides a first communication system. The first communication system may include the first terminal apparatus in the embodiment shown in FIG. 3, and include the second terminal apparatus in the embodiment shown in FIG. 3. Alternatively, the first communication system may include the first terminal apparatus in the embodiment shown in FIG. 5, and include the second terminal apparatus in the embodiment shown in FIG. 5. Alternatively, the first communication system may include the first terminal apparatus in the embodiment shown in FIG. 6, and include the second terminal apparatus in the embodiment shown in FIG. 6. The first terminal apparatus included in the first communication system is, for example, the first terminal apparatus 700 in FIG. 7. The second terminal apparatus included in the first communication system is, for example, the second terminal apparatus 800 in FIG. 8.

An embodiment of this application provides a first communication system. The first communication system may include the first terminal apparatus in the embodiment shown in FIG. 4, and include the second terminal apparatus in the embodiment shown in FIG. 4. The first terminal apparatus included in the second communication system is, for example, the first terminal apparatus 900 in FIG. 9. The second terminal apparatus included in the second communication system is, for example, the second terminal apparatus 1000 in FIG. 10.

An embodiment of this application further provides a computer-readable storage medium. The computer-readable storage medium stores a computer program. When the computer program is executed by a computer, the computer may implement a procedure related to the first terminal apparatus in the embodiment shown in FIG. 3 provided in the method embodiments.

An embodiment of this application further provides a computer-readable storage medium. The computer-readable storage medium stores a computer program. When the computer program is executed by a computer, the computer may implement a procedure related to the second terminal apparatus in the embodiment shown in FIG. 3 provided in the method embodiments.

An embodiment of this application further provides a computer-readable storage medium. The computer-readable storage medium stores a computer program. When the computer program is executed by a computer, the computer may implement a procedure related to the first terminal apparatus in the embodiment shown in FIG. 4 provided in the method embodiments.

An embodiment of this application further provides a computer-readable storage medium. The computer-readable storage medium stores a computer program. When the computer program is executed by a computer, the computer may implement a procedure related to the second terminal apparatus in the embodiment shown in FIG. 4 provided in the method embodiments.

An embodiment of this application further provides a computer-readable storage medium. The computer-readable storage medium stores a computer program. When the computer program is executed by a computer, the computer may implement a procedure related to the first terminal apparatus in the embodiment shown in FIG. 5 provided in the method embodiments.

An embodiment of this application further provides a computer-readable storage medium. The computer-readable storage medium stores a computer program. When the computer program is executed by a computer, the computer may implement a procedure related to the second terminal apparatus in the embodiment shown in FIG. 5 provided in the method embodiments.

An embodiment of this application further provides a computer-readable storage medium. The computer-readable storage medium stores a computer program. When the computer program is executed by a computer, the computer may implement a procedure related to the first terminal apparatus in the embodiment shown in FIG. 6 provided in the method embodiments.

An embodiment of this application further provides a computer-readable storage medium. The computer-readable storage medium stores a computer program. When the computer program is executed by a computer, the computer may implement a procedure related to the second terminal apparatus in the embodiment shown in FIG. 6 provided in the method embodiments.

An embodiment of this application further provides a computer program product. The computer program product is configured to store a computer program. When the computer program is executed by a computer, the computer may implement a procedure related to the first terminal apparatus in the embodiment shown in FIG. 3 provided in the method embodiments.

An embodiment of this application further provides a computer program product. The computer program product is configured to store a computer program. When the computer program is executed by a computer, the computer may implement a procedure related to the second terminal apparatus in the embodiment shown in FIG. 3 provided in the method embodiments.

An embodiment of this application further provides a computer program product. The computer program product is configured to store a computer program. When the computer program is executed by a computer, the computer may implement a procedure related to the first terminal apparatus in the embodiment shown in FIG. 4 provided in the method embodiments.

An embodiment of this application further provides a computer program product. The computer program product is configured to store a computer program. When the computer program is executed by a computer, the computer may implement a procedure related to the second terminal apparatus in the embodiment shown in FIG. 4 provided in the method embodiments.

An embodiment of this application further provides a computer program product. The computer program product is configured to store a computer program. When the computer program is executed by a computer, the computer may implement a procedure related to the first terminal apparatus in the embodiment shown in FIG. 5 provided in the method embodiments.

An embodiment of this application further provides a computer program product. The computer program product is configured to store a computer program. When the computer program is executed by a computer, the computer may implement a procedure related to the second terminal apparatus in the embodiment shown in FIG. 5 provided in the method embodiments.

An embodiment of this application further provides a computer program product. The computer program product is configured to store a computer program. When the computer program is executed by a computer, the computer may implement a procedure related to the first terminal apparatus in the embodiment shown in FIG. 6 provided in the method embodiments.

An embodiment of this application further provides a computer program product. The computer program product is configured to store a computer program. When the computer program is executed by a computer, the computer may implement a procedure related to the second terminal apparatus in the embodiment shown in FIG. 6 provided in the method embodiments.

It should be understood that the processor mentioned in embodiments of this application may be a CPU, or may be another general-purpose processor, a digital signal processor (DSP), an application specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps can be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate. Parts displayed as units may or may not be physical units, in other words, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
sending, by a first terminal apparatus, K2 first reference signals to a second terminal apparatus in K1 directions, wherein each of the K1 directions is a direction of a beam selectable by the first terminal apparatus to send a data signal to the second terminal apparatus, each first reference signal in each of the K2 first reference signals is configured to be used to detect whether a beam in a direction in which the respective first reference signal is located fails, both K1 and K2 are positive integers, and K2 is greater than or equal to K1;
determining, by the first terminal apparatus, that beams in the K1 directions all fail for N1 consecutive times, wherein N1 is a positive integer;
sending, by the first terminal apparatus, P2 second reference signals to the second terminal apparatus in P1 directions, wherein each second reference signal in the P2 second reference signals is configured to be used to measure quality of a beam in a direction in which a first reference signal of the K2 first reference signals is located, the P1 directions are a part or all of sending directions supported by the first terminal apparatus, P1 is a positive integer, and P2 is an integer greater than or equal to P1;
receiving, by the first terminal apparatus, measurement results that are of the P2 second reference signals and that are from the second terminal apparatus; and determining, by the first terminal apparatus based on the measurement results of the P2 second reference signals, whether P1 beams corresponding to the P1 directions are available.

2. The method according to claim 1, further comprising:
sending, by the first terminal apparatus, a second message to the second terminal apparatus, wherein the second message indicates an available beam in the P1 beams or indicates that none of the P1 beams is available; or
when the first terminal apparatus determines that none of the P1 beams is available, skipping sending, by the first terminal apparatus, a second message to the second terminal apparatus.

3. The method according to claim 1, further comprising:
recovering, by the first terminal apparatus, one or more of the P1 beams using a radio resource control (RRC) layer of the first terminal apparatus.

4. The method according to claim 1, wherein determining, by the first terminal apparatus, that beams in the K1 directions all fail for N1 consecutive times comprises:
receiving, by the first terminal apparatus, a first message from the second terminal apparatus, wherein the first message indicates results of measuring the K2 first reference signals by the second terminal apparatus; and
determining, by the first terminal apparatus based on the measurement results of the K2 first reference signals, that the beams in the K1 directions all fail for the N1 consecutive times.

5. The method according to claim 1, further comprising:
sending, by the first terminal apparatus, M2 third reference signals to the second terminal apparatus in M1 directions, wherein each third reference signal in the M2 third reference signals is configured to be used to detect whether a beam in a direction in which the respective third reference signal is located is useable to recover a communication connection, M1 is a positive integer, and M2 is an integer greater than or equal to M1; and
determining, by the first terminal apparatus, that for N2 consecutive times, none of beams in the M1 directions are usable to recover the communication connection, wherein N2 is a positive integer.

6. The method according to claim 5, wherein determining, by the first terminal apparatus, that beams in the K1 directions all fail for N1 consecutive times and the determining that for N2 consecutive times, none of beams in the M1 directions can be used to recover the communication connection comprise:
receiving, by the first terminal apparatus, a beam failure recovery request (BFRR) from the second terminal apparatus, wherein the BFRR indicates that the beams in the K1 directions all fail for the N1 consecutive times and that for the N2 consecutive times, and none of the beams in the M1 directions are usable to recover the communication connection.

7. The method according to claim 6, further comprising:
sending, by the first terminal apparatus, a second response message to the second terminal apparatus, wherein the second response message is a response message for the BFRR.

8. A terminal apparatus, comprising:
at least one processor; and
a non-transitory computer-readable storage medium storing instructions that are executable by the at least one processor, the instructions comprising instructions for:
sending K2 first reference signals to a second terminal apparatus in K1 directions, wherein each of the K1 directions is a direction of a beam selectable by the terminal apparatus to send a data signal to the second terminal apparatus, each first reference signal in the K2 first reference signals is configured to be used to detect whether a beam in a direction in which the respective first reference signal is located fails, both K1 and K2 are positive integers, and K2 is greater than or equal to K1;
determine that beams in the K1 directions all fail for N1 consecutive times, wherein N1 is a positive integer;
send P2 second reference signals to the second terminal apparatus in P1 directions, wherein each second reference signal in the P2 second reference signals is configured to be used to measure quality of a beam in a direction in which a first reference signal of the K2 first reference signals is located, the P1 directions are a part or all of sending directions supported by the terminal apparatus, P1 is a positive integer, and P2 is an integer greater than or equal to P1;
receive measurement results that are of the P2 second reference signals and that are from the second terminal apparatus; and
determine, based on the measurement results of the P2 second reference signals, whether P1 beams corresponding to the P1 directions are available.

9. The terminal apparatus according to claim 8, wherein the instructions further comprise instructions for:
sending a second message to the second terminal apparatus, wherein the second message indicates an available beam in the P1 beams or indicates that none of the P1 beams is available; or
when determining that none of the P1 beams is available, skipping sending a second message to the second terminal apparatus.

10. The terminal apparatus according to claim 8, wherein the instructions further comprise instructions for:
recovering one or more of the P1 beams by using a radio resource control (RRC) layer of the terminal apparatus.

11. The terminal apparatus according to claim 8, wherein the instructions further comprise instructions for:
determining, in the following manner, that the beams in the K1 directions all fail for the N1 consecutive times:
receiving a first message from the second terminal apparatus, wherein the first message indicates results of measuring the K2 first reference signals by the second terminal apparatus; and
determining, based on the measurement results of the K2 first reference signals, that the beams in the K1 directions all fail for the N1 consecutive times.

12. The terminal apparatus according to claim 8, wherein the instructions further comprise instructions for:
sending M2 third reference signals to the second terminal apparatus in M1 directions, wherein each third reference signal in the M2 third reference signals is configured to be used to detect whether a beam in a direction in which the respective third reference signal is located is usable to recover a communication connection, M1 is a positive integer, and M2 is an integer greater than or equal to M1; and
determining that for N2 consecutive times, none of beams in the M1 directions are usable to recover the communication connection, wherein N2 is a positive integer.

13. The terminal apparatus according to claim 12, wherein the instructions further comprise instructions for:
in the following manner, determining that the beams in the K1 directions all fail for the N1 consecutive times and determining that for the N2 consecutive times, none of the beams in the M1 directions are usable to recover the communication connection:

receiving a beam failure recovery request (BFRR) from the second terminal apparatus, wherein the BFRR indicates that the beams in the K1 directions all fail for the N1 consecutive times and that for the N2 consecutive times, none of the beams in the M1 directions are usable to recover the communication connection.

14. The terminal apparatus according to claim 13, wherein the instructions further comprise instructions for:

sending a second response message to the second terminal apparatus, wherein the second response message is a response message for the BFRR.

15. A terminal apparatus, comprising:

at least one processor; and a non-transitory computer-readable storage medium storing instructions that are executable by the at least one processor, the instructions comprising instructions for:

receiving, or attempting to receive, K2 first reference signals in K1 directions corresponding to a first terminal apparatus, wherein each of the K1 directions is a direction of a beam usable by the first terminal apparatus to send a data signal to the terminal apparatus, each first reference signal in the K2 first reference signals is configured to be used to detect whether a beam in a direction in which the respective first reference signal is located fails, K1 is a positive integer, and K2 is an integer greater than or equal to K1;

sending a first message or a beam failure recovery request (BFRR) to the first terminal apparatus, wherein the first message indicates results of measuring the K2 first reference signals by the terminal apparatus, and the BFRR indicates that beams in the K1 directions all fail for N1 consecutive times;

receiving P2 second reference signals in P1 directions corresponding to the first terminal apparatus, wherein each second reference signal in the P2 second reference signals is configured to be used to measure quality of a beam in a direction in which the respective second reference signal is located, the P1 directions are all or a part of sending directions supported by the first terminal apparatus, P1 is a positive integer, and P2 is an integer greater than or equal to P1;

measuring the P2 second reference signals; and sending measurement results of the P2 second reference signals to the first terminal apparatus, wherein the measurement results of the P2 second reference signals are used to determine whether there is an available beam in P1 beams.

16. The terminal apparatus according to claim 15, wherein the instructions further comprise instructions for:

receiving a second message from the first terminal apparatus, wherein the second message indicates the available beam in the P1 beams or indicates that none of the P1 beams is available.

17. The terminal apparatus according to claim 15, wherein the instructions further comprise instructions for:

when determining that the terminal apparatus does not receive a second message from the first terminal apparatus, determine that none of the P1 beams is available.

18. The terminal apparatus according to claim 15, wherein the instructions further comprise instructions for:

recovering one or more of the P1 beams by using a radio resource control (RRC) layer of the terminal apparatus.

19. The terminal apparatus according to claim 15, wherein the instructions further comprise instructions for:

receiving M2 third reference signals from the first terminal apparatus in M1 directions, wherein each third reference signal is configured to be used to detect whether a beam in a corresponding direction is usable to recover a communication connection, M1 is a positive integer, and M2 is an integer greater than or equal to M1.

20. The terminal apparatus according to claim 19, wherein the instructions further comprise instructions for:

sending a fourth message or the BFRR to the first terminal apparatus, wherein the fourth message indicates results of measuring the M2 third reference signals by the terminal apparatus, and the BFRR further indicates that for N2 consecutive times, none of beams in the M1 directions are usable to recover the communication connection.

\* \* \* \* \*